(12) United States Patent
Goto et al.

(10) Patent No.: US 12,047,770 B2
(45) Date of Patent: Jul. 23, 2024

(54) COMMUNICATION APPARATUS, CONTROL METHOD OF COMMUNICATION APPARATUS, COMPUTER PROGRAM, AND STORAGE MEDIUM

(71) Applicant: CANON KABUSHIKI KAISHA, Tokyo (JP)

(72) Inventors: Fumihide Goto, Naka-gun (JP); Tatsuhiko Sakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/143,627

(22) Filed: May 5, 2023

(65) Prior Publication Data

US 2023/0276232 A1 Aug. 31, 2023

Related U.S. Application Data

(63) Continuation of application No. 17/393,732, filed on Aug. 4, 2021, now Pat. No. 11,678,179, which is a (Continued)

(30) Foreign Application Priority Data

Oct. 6, 2008 (JP) .................................. 2008-259997

(51) Int. Cl.
*H04L 43/12* (2022.01)
*H04W 8/00* (2009.01)
(Continued)

(52) U.S. Cl.
CPC ........... *H04W 12/041* (2021.01); *H04L 43/12* (2013.01); *H04W 12/0431* (2021.01);
(Continued)

(58) Field of Classification Search
None
See application file for complete search history.

(56) References Cited

U.S. PATENT DOCUMENTS

| | | | |
|---|---|---|---|
| 6,445,283 B1 * | 9/2002 | Pang | ........................ G07C 9/28 340/5.1 |
| 7,949,358 B2 | 5/2011 | Wentink et al. | |

(Continued)

FOREIGN PATENT DOCUMENTS

| | | |
|---|---|---|
| CN | 1606891 A | 4/2005 |
| CN | 1666558 A | 9/2005 |

(Continued)

OTHER PUBLICATIONS

Chinese Office Action issued in corresponding application No. 200980139671.3 on Apr. 3, 2013.

(Continued)

*Primary Examiner* — Mohammed Rachedine
(74) *Attorney, Agent, or Firm* — Carter, DeLuca & Farrell LLP

(57) ABSTRACT

A communication apparatus connectable to a communication network notifies the presence of the communication apparatus using a communication channel assigned to the communication apparatus, then sets one communication channel different from the assigned communication channel of those available in the communication network, and searches for a communication partner apparatus which functions as a providing apparatus that provides communication parameters using the set communication channel. The communication apparatus repetitively executes the notification processing and the search processing, and changes a communication channel used in the search processing every time the repetition is executed one or a plurality of number of times.

22 Claims, 17 Drawing Sheets

Related U.S. Application Data continuation of application No. 16/592,208, filed on Oct. 3, 2019, now Pat. No. 11,115,816, which is a continuation of application No. 16/216,223, filed on Dec. 11, 2018, now Pat. No. 10,462,696, which is a continuation of application No. 14/817,781, filed on Aug. 4, 2015, now Pat. No. 10,200,903, which is a continuation of application No. 13/122,619, filed as application No. PCT/JP2009/067283 on Sep. 28, 2009, now Pat. No. 9,125,237.

(51) Int. Cl.
    H04W 12/04      (2021.01)
    H04W 12/041     (2021.01)
    H04W 12/0431    (2021.01)
    H04W 12/0433    (2021.01)
    H04W 12/06      (2021.01)
    H04W 12/069     (2021.01)
    H04W 24/10      (2009.01)
    H04W 28/18      (2009.01)
    H04W 68/00      (2009.01)
    H04W 72/00      (2023.01)
    H04W 76/10      (2018.01)
    H04W 84/12      (2009.01)
    H04W 84/18      (2009.01)
    H04W 84/20      (2009.01)

(52) U.S. Cl.
    CPC ..... *H04W 12/0433* (2021.01); *H04W 12/069* (2021.01); *H04W 24/10* (2013.01); *H04W 84/20* (2013.01); *H04W 8/005* (2013.01); *H04W 28/18* (2013.01); *H04W 68/00* (2013.01); *H04W 72/00* (2013.01); *H04W 84/18* (2013.01)

(56) References Cited

U.S. PATENT DOCUMENTS

| | | | |
|---|---|---|---|
| 8,054,852 B2 | 11/2011 | Yamada et al. | |
| 8,089,927 B2 | 1/2012 | Matsuo et al. | |
| 8,178,457 B2 | 5/2012 | de Rochemont | |
| 8,238,835 B2* | 8/2012 | Nagai | H04W 72/27 455/67.11 |
| 8,243,622 B2 | 8/2012 | Shin et al. | |
| 8,248,961 B2 | 8/2012 | Fujii | |
| 8,280,349 B2 | 10/2012 | Ishikawa et al. | |
| 8,289,987 B2 | 10/2012 | Adachi et al. | |
| 8,625,445 B2 | 1/2014 | Sakai | |
| 8,891,771 B2 | 11/2014 | Sakai et al. | |
| 8,918,500 B2 | 12/2014 | Goto | |
| 8,948,380 B2 | 2/2015 | Goto | |
| 8,949,386 B2 | 2/2015 | Goto | |
| 8,959,236 B2 | 2/2015 | Tachibana | |
| 9,088,860 B2 | 7/2015 | Sakai et al. | |
| 9,271,312 B2 | 2/2016 | Goto | |
| 9,307,387 B2 | 4/2016 | Sakai et al. | |
| 9,497,788 B2 | 11/2016 | Goto | |
| 9,872,129 B2 | 1/2018 | Goto | |
| 9,980,084 B2 | 5/2018 | Goto | |
| 10,200,903 B2 | 2/2019 | Goto | |
| 10,462,696 B2 | 10/2019 | Goto | |
| 11,115,816 B2 | 9/2021 | Goto | |
| 11,405,979 B2 | 8/2022 | Sakai | |
| 2002/0085516 A1* | 7/2002 | Bridgelall | H04W 36/04 370/329 |
| 2003/0203741 A1 | 10/2003 | Matsuo et al. | |
| 2005/0094608 A1 | 5/2005 | Yokota | |
| 2006/0142034 A1* | 6/2006 | Wentink | H04W 8/005 455/515 |
| 2006/0166695 A1* | 7/2006 | Morich | H04W 8/06 455/550.1 |
| 2006/0176846 A1 | 8/2006 | Miki et al. | |
| 2006/0268744 A1* | 11/2006 | Sakai | H04L 67/303 370/254 |
| 2007/0088951 A1 | 4/2007 | Nakajima | |
| 2007/0091864 A1 | 4/2007 | Honjo et al. | |
| 2007/0110084 A1 | 5/2007 | Bennett | |
| 2007/0140163 A1* | 6/2007 | Meier | H04W 8/005 370/329 |
| 2007/0197238 A1* | 8/2007 | Nakajima | H04W 12/08 455/411 |
| 2007/0286136 A1 | 12/2007 | Rittle et al. | |
| 2008/0049702 A1* | 2/2008 | Meylan | H04W 12/084 370/342 |
| 2008/0089300 A1 | 4/2008 | Yee | |
| 2009/0097464 A1 | 4/2009 | Sakoda | |
| 2009/0310583 A1 | 12/2009 | Suzuki | |
| 2010/0020706 A1* | 1/2010 | Fujii | H04W 28/18 370/254 |
| 2010/0046394 A1* | 2/2010 | Fujii | H04W 16/18 370/254 |
| 2011/0038443 A1 | 2/2011 | Sakai | |
| 2011/0149937 A1 | 6/2011 | Gupta et al. | |
| 2011/0191473 A1 | 8/2011 | Sakai et al. | |
| 2011/0206029 A1 | 8/2011 | Fujii | |
| 2012/0063327 A1 | 3/2012 | Sakai | |
| 2012/0147871 A1 | 6/2012 | Nakamura | |
| 2019/0334892 A1 | 10/2019 | Goto | |
| 2021/0368336 A1 | 11/2021 | Goto | |
| 2022/0330379 A1 | 10/2022 | Sakai | |

FOREIGN PATENT DOCUMENTS

| | | | |
|---|---|---|---|
| CN | 1973487 A | 5/2007 | |
| JP | 2006309458 A | 11/2006 | |
| JP | 2006311139 A | 11/2006 | |
| JP | 2006345205 A | 12/2006 | |
| JP | 2007228249 A | 9/2007 | |
| JP | 2007325064 A | 12/2007 | |
| JP | 2008187348 A | 8/2008 | |
| JP | 2008219358 A | 9/2008 | |
| JP | 2009545924 A | 12/2009 | |
| WO | 2006071650 A2 | 7/2006 | |
| WO | 2006098116 A1 | 9/2006 | |
| WO | 2008019140 A | 2/2008 | |
| WO | 2008050622 A1 | 5/2008 | |
| WO | WO-2008050622 A1 * | 5/2008 | ............ H04W 28/18 |
| WO | 2008093817 A1 | 8/2008 | |
| WO | WO-2008093817 A1 * | 8/2008 | ......... H04L 41/0803 |
| WO | 2009031597 A1 | 3/2009 | |
| WO | WO-2009031597 A1 * | 3/2009 | ......... H04L 41/0806 |
| WO | 2009147163 A1 | 12/2009 | |
| WO | WO-2009147163 A1 * | 12/2009 | ......... G06F 21/6254 |

OTHER PUBLICATIONS

Yanfeng Zhu, et al., "A Multi-AP Architecture for High-Density WLANs: Protocol Design and Experimental Evaluation," 5th Annual IEEE Communications Society Conference on Sensor, Mesh and Ad Hoc Communications and Networks, pp. 28-36, Jun. 16-20, 2008.

Rui Zhao, et al., "An Efficient IEEE 802.11 ESS Mesh Network Supporting Quality-of-Service," IEEE Journal on Selected Areas in Communications, vol. 24, No. 11, pp. 2005-2017, Nov. 2006.

N. Manivannan, et al., "Alternative Pair-wise Key Exchange Protocols (IEEE 802.11i) in Wireless LANs," International Conference on Wireless and Mobile Communications, pp. 52-59, Jul. 29-31, 2006.

Jing Zhu, et al., "Adaptive CSMA for Scalable Network Capacity in High-Density Wlan: A Hardware Prototyping Approach," 25th IEEE International Conference on Computer Communications, pp. 1-10, 2006.

Japanese Office Action issued in corresponding application No. 2012-241073 on Nov. 25, 2013.

L Tang, et al., Architecture Taxonomy for Control and Provisioning of Wireless Access Points, Jun. 2005.

"Wi-Fi Certified for Wi-Fi Protcted Setup: Easing the User Experience for Home and Small Office Wi-Fi Networks" {URL: http:/fwww.wi-fi .org/wp/wifi-protected-setup).

(56) References Cited

OTHER PUBLICATIONS

IEEE 802.11 i standard.
Wi-Fi Protected Setup Specification Version 1.0h Dec. 2006.
European Search Report issued in corresponding European Application No. 09819147.1 on May 4, 2016.
Office Action for corresponding Japanese Application No. 2016-074572 mailed Jan. 23, 2017.
Chinese Office Action for application No. 201510127800.4 dated Dec. 19, 2017 (9 pages).
Chinese Office Action for application No. 201510127800.4 dated Dec. 12, 2017 (9 pages).

* cited by examiner

F I G. 10

SUPPORTED AUTHENTICATION / ENCRYPTION METHOD

| AUTHENTICATION METHOD | ENCRYPTION METHOD |
|---|---|
| Open | NO ENCRYPTION |
| | WEP |
| Shared | WEP |
| WPA | TKIP |
| | CCMP |
| WPA-PSK | TKIP |
| | CCMP |
| WPA2 | TKIP |
| | CCMP |
| WPA2-PSK | TKIP |
| | CCMP |

FIG. 11

NUMBER OF HELD KEYS

| METHOD | pairwise key | group key | total |
|---|---|---|---|
| IEEE802.11i full spec | n − 1 | n + 1 | 2n |
| (1) reduce Seq | n − 1 | n + 1 | 2n |
| (2) reduce Key | n − 1 | 1 | n |
| (3) WPA-None | 0 | 1 | 1 |
| (4) WPA Key Exchange over WPS handshake | n − 1 | n + 1 or 1 | 2n or n |

NUMBER OF KEY EXCHANGES EXECUTED PER OTHER APPARATUS

| METHOD | 4-Way Handshake | Group key Handshake |
|---|---|---|
| IEEE802.11i full spec | 2 | 2 |
| (1) reduce Seq | 1 | 2 |
| (2) reduce Key | 1 or 2 | 1 |
| (3) WPA-None | 0 | 0 |
| (4) WPA Key Exchange over WPS handshake | 0 | 0 or 1 or 2 |

COMMUNICATION APPARATUS, CONTROL METHOD OF COMMUNICATION APPARATUS, COMPUTER PROGRAM, AND STORAGE MEDIUM

CROSS REFERENCE TO RELATED APPLICATIONS

This application is a continuation of U.S. patent application Ser. No. 17/393,732, filed on Aug. 4, 2021, which is a continuation of U.S. Pat. No. 11,115,816, filed Oct. 3, 2019, which is a continuation of U.S. Pat. No. 10,462,696, filed Dec. 11, 2018, which is a continuation of U.S. Pat. No. 10,200,903, filed Aug. 4, 2015, which is a continuation of U.S. Pat. No. 9,125,237, filed Apr. 5, 2011, which is the U.S. National Stage Application of International Application No. PCT/JP2009/067283, filed Sep. 28, 2009, which claims the benefit of and priority to Japanese Patent Application No. 2008-259997, filed Oct. 6, 2008, the entire contents of each of which are hereby incorporated by reference herein in their entirety.

TECHNICAL FIELD

The present invention relates to a communication apparatus, communication method, computer program, and storage medium.

BACKGROUND ART

In wireless communications represented by wireless LANs compliant with the IEEE802.11 standard series, there are many setting items which have to be set before use. For example, such setting items include communication parameters required to make wireless communications such as an SSID as a network identifier, encryption method, encryption key, authentication method, and authentication key, and it is very troublesome for the user to manually input these parameters.

Hence, various manufacturers have proposed automatic setting methods that allow the user to easily set communication parameters in wireless apparatuses. With these automatic setting methods, one apparatus provides communication parameters to the other apparatus using procedures and messages, which are determined in advance between the apparatuses to be connected, thus automatically setting the communication parameters.

Japanese Patent Laid-Open No. 2006-311139 (to be referred to as patent reference 1 hereinafter) discloses an example of automatic communication parameter setting processing in a communication in a wireless LAN ad hoc mode (to be referred to as an ad hoc communication hereinafter). Wi-Fi CERTIFIED for Wi-Fi Protected Setup: Easing the User Experience for Home and Small Office Wi-Fi Networks, http://www.wi-fi.org/wp/wifi-protected-setup (to be referred to as non-patent reference 1 hereinafter) discloses "Wi-Fi Protected Setup" (to be abbreviated as WPS hereinafter) as the industry standard specification of the automatic communication parameter setting processing between an access point (base station) and station (terminal station). Also, Wi-Fi Protected Access Enhanced Security Implementation Based on IEEE P802.11i standard (to be referred to as non-patent reference 2 hereinafter) discloses "Wi-Fi Protected Access" (to be abbreviated as WPA hereinafter) as the industry standard specification of an encryption method, encryption key, authentication method, authentication key, and the like in wireless communication connection processing.

With the WPS, since the roles of an apparatus for providing the communication parameters (to be referred to as a providing apparatus hereinafter) and an apparatus which receives the communication parameters (to be referred to as a receiving apparatus hereinafter) are determined in advance, the transfer direction of the communication parameters is also uniquely determined.

However, when the roles of the providing apparatus and receiving apparatus are not determined in advance, the transfer direction of the communication parameters cannot be uniquely determined. In this case, when the user selects an apparatus to be used as a providing apparatus and that to be used as a receiving apparatus, user's operability impairs.

Furthermore, when a plurality of apparatuses are selected as providing apparatuses, the receiving apparatus cannot discriminate a providing apparatus from which the communication parameters are to be received.

The aforementioned problems may also occur when a new apparatus is added to a network already built between a plurality of apparatuses. In this case, it is desirable that an apparatus which is already a participant of the network serves as a providing apparatus, and a new apparatus as a prospective participant receives the communication parameters of the network. However, since the roles of the providing apparatus and receiving apparatus are not determined in advance, appropriate communication parameters cannot be set in the new apparatus as the prospective participant.

The aforementioned problems may also occur not only in the communication parameters of wireless communications but also in those of wired communications that require settings in communications between apparatuses.

DISCLOSURE OF INVENTION

One embodiment of the present invention provides a communication apparatus which can set appropriate communication parameters without impairing user's operability even when the roles are not determined in advance in automatic communication parameter setting processing, and a control method thereof.

According to one aspect of the present invention, there is provided a communication apparatus connectable to a communication network, comprising:
  notification means for notifying the presence of the communication apparatus using a communication channel assigned to the communication apparatus;
  search means for setting one communication channel different from the assigned communication channel of communication channels available in the communication network, and searching for a communication partner apparatus which functions as a providing apparatus that provides communication parameters using the set communication channel; and
  a control means for controlling the notification means and the search means to alternately repeat the notification processing and the search processing, and changing a communication channel used by the search means every time the repetition is executed one or a plurality of number of times.

According to another aspect of the present invention, there is provided a communication apparatus connectable to a communication network, comprising:

notification means for notifying the presence of the communication apparatus using a predetermined communication channel of communication channels available in the communication network in response to a start instruction of automatic communication parameter setting processing;

search means for searching for a communication partner apparatus which functions as a providing apparatus that provides communication parameters using the predetermined communication channel;

setting means for executing the automatic communication parameter setting processing with the communication partner apparatus found by the search means; and restoring means for restoring the communication channel to a communication channel before beginning of the automatic communication parameter setting processing after completion of the automatic communication parameter setting processing.

According to another aspect of the present invention, there is provided a method of controlling a communication apparatus connectable to a communication network, comprising:

a notification step of notifying the presence of the communication apparatus using a communication channel assigned to the communication apparatus;

a search step of setting one communication channel different from the assigned communication channel of communication channels available in the communication network, and searching for a communication partner apparatus which functions as a providing apparatus that provides communication parameters using the set communication channel; and a control step of controlling the notification step and the search step to alternately repeat the notification processing and the search processing, and changing a communication channel used in the search step every time the repetition is executed one or a plurality of number of times.

According to another aspect of the present invention, there is provided a method of controlling a communication apparatus connectable to a communication network, comprising:

a notification step of notifying the presence of the communication apparatus using a predetermined communication channel of communication channels available in the communication network in response to a start instruction of automatic communication parameter setting processing;

a search step of searching for a communication partner apparatus which functions as a providing apparatus that provides communication parameters using the predetermined communication channel;

a setting step of executing the automatic communication parameter setting processing with the communication partner apparatus found in the search step; and a restoring step of restoring the communication channel to a communication channel before beginning of the automatic communication parameter setting processing after completion of the automatic communication parameter setting processing.

Further features of the present invention will become apparent from the following description of exemplary embodiments with reference to the attached drawings.

BRIEF DESCRIPTION OF DRAWINGS

FIG. 10 is a table of supported authentication and encryption methods;

FIG. 11 is a comparison table of possessed keys and key exchange sequences in key exchange algorithms;

BEST MODE FOR CARRYING OUT THE INVENTION

First Embodiment

A communication apparatus according to this embodiment will be described in detail hereinafter with reference to the drawings. An example using a wireless LAN system complaint with the IEEE802.11 series will be described hereinafter, but a communication mode is not always limited to a wireless LAN compliant with the IEEE802.11.

The hardware arrangement in a case example suited to this embodiment will be described below.

Figure 1:
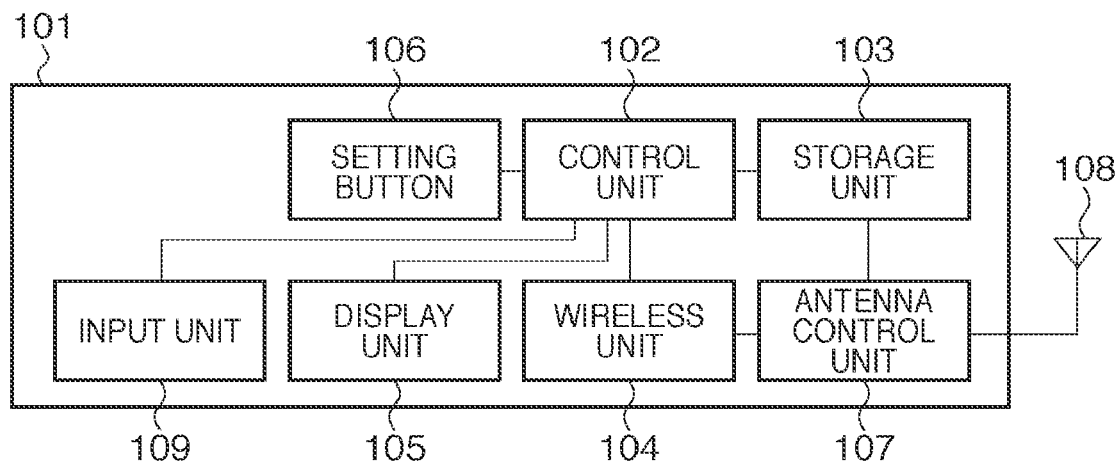
FIG. 1 is a block diagram showing the arrangement of a communication apparatus according to an embodiment of the present invention.

FIG. 1 is a block diagram showing an example of the arrangement of a communication apparatus (providing apparatus or receiving apparatus) which can be connected to a communication network, according to an embodiment of the present invention. Reference numeral 101 denotes a whole apparatus. Reference numeral 102 denotes a control unit which controls the whole apparatus by executing a computer program stored in a storage unit 103. The control unit 102 also executes communication parameter setting control with another apparatus. Reference numeral 103 denotes a storage unit which stores the computer program to be executed by the control unit 102, and various kinds of information such as communication parameters. Various operations to be described later are implemented when the control unit 102 executes the computer program stored in the storage unit 103.

Reference numeral 104 denotes a wireless unit used to make wireless communications. Reference numeral 105 denotes a display unit which makes various displays, and has a function that can output visually perceivable information like an LCD or LED or can output audible information like a loudspeaker.

Reference numeral 106 denotes a setting button which gives a trigger to start communication parameter setting processing. The control unit 102 executes processing to be described later when it detects a user's operation of the setting button 106.

Reference numeral 107 denotes an antenna control unit; and 108, an antenna. Reference numeral 109 denotes an input unit which allows the user to make various inputs.

Figure 2:
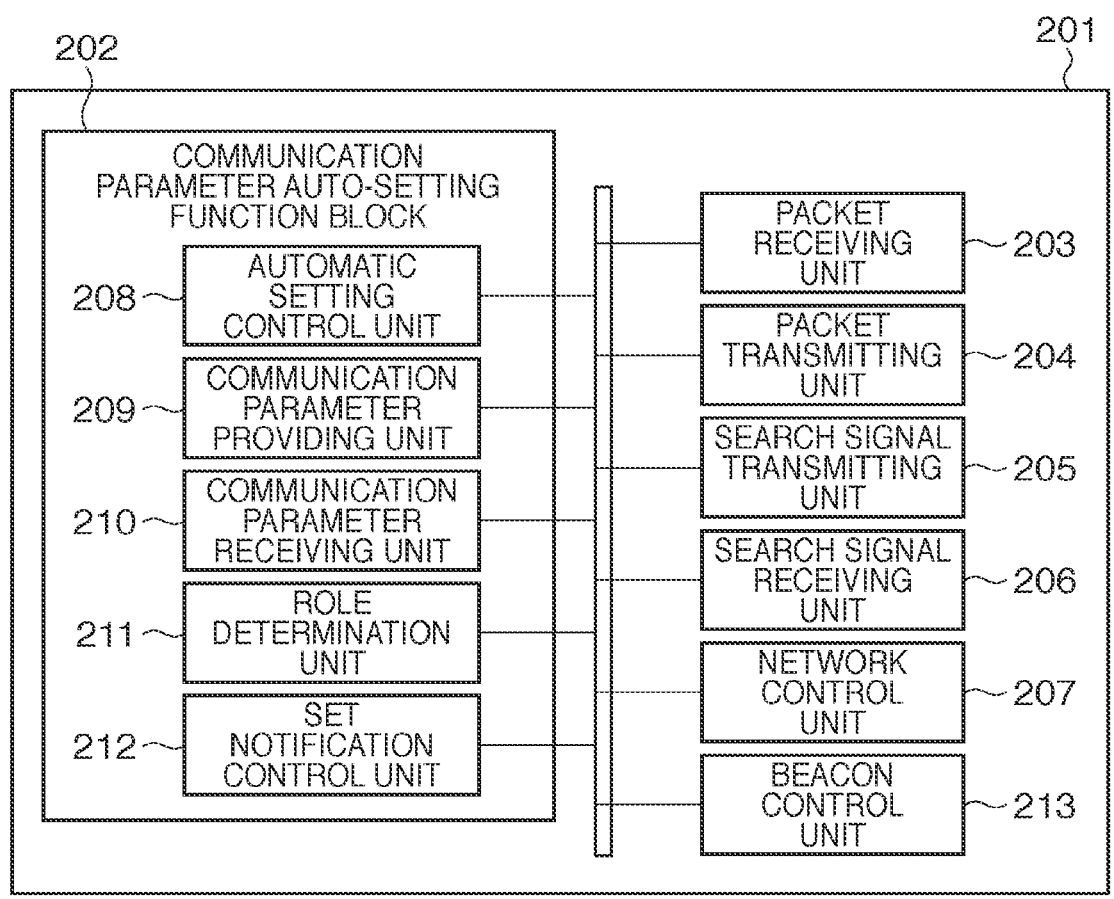
FIG. 2 is a block diagram showing software functions in the apparatus according to the embodiment of the present invention.

FIG. 2 is a block diagram showing an example of the arrangement of software functional blocks to be executed by respective apparatuses to be described later in a communication parameter setting operation to be described later.

Reference numeral 201 denotes a whole apparatus. Reference numeral 202 denotes a communication parameter auto-setting function block. In this embodiment, the communication parameter auto-setting function block 202 automatically sets communication parameters required to make wireless communications such as an SSID as a network identifier, encryption method, encryption key, authentication method, and authentication key.

Reference numeral 203 denotes a packet receiving unit which receives packets associated with various communications. The packet receiving unit 203 receives a beacon (notification signal). Reference numeral 204 denotes a packet transmitting unit which transmits packets associated with various communications. The packet transmitting unit 204 transmits a beacon. Note that the beacon is added with various kinds of information (self-information) of a transmission source apparatus.

Reference numeral 205 denotes a search signal transmitting unit which controls transmission of an apparatus search signal such as a probe request. Note that the probe request can also be expressed as a network search signal used to search for a desired network. The search signal transmitting unit 205 transmits the probe request. Also, the search signal transmitting unit 205 transmits a probe response as a reply signal to the received probe request.

Reference numeral 206 denotes a search signal receiving unit which controls reception of an apparatus search signal such as a probe request from another apparatus. The search signal receiving unit 206 receives the probe request. Also, the search signal receiving unit 206 receives a probe response. Note that the apparatus search signal and its reply signal are added with various kinds of information (self-information) of a transmission source apparatus.

Reference numeral 207 denotes a network control unit which controls network connections. The network control unit 207 executes, for example, connection processing to a wireless LAN ad hoc network.

In the communication parameter auto-setting function block, reference numeral 208 denotes an automatic setting control unit which controls various protocols in automatic communication parameter setting processing.

Reference numeral 209 denotes a communication parameter providing unit which provides communication parameters to a partner apparatus. The communication parameter providing unit 209 executes providing processing in the automatic communication parameter setting processing (to be described later) under the control of the automatic setting control unit 208. Reference numeral 210 denotes a communication parameter receiving unit which receives communication parameters from a partner apparatus. The communication parameter receiving unit 210 executes receiving processing in the automatic communication parameter setting processing (to be described later) under the control of the automatic setting control unit 208.

The automatic setting control unit 208 also determines whether or not an elapsed time period after the beginning of the automatic communication parameter setting processing exceeds a limit time of that setting processing. When it is determined that the elapsed time period exceeds the limit time, the setting processing is aborted under the control of the automatic setting control unit 208.

Reference numeral 211 denotes a role determination unit which determines a role in the automatic communication parameter setting processing. The role determination unit 211 executes role determination processing to be described later.

Reference numeral 212 denotes a set notification control unit which controls processing associated with start and completion notifications of the automatic communication parameter setting processing. The set notification control unit 212 executes transmitting/receiving processing of a start notification message, start notification reply message, and completion notification message in a providing apparatus to be described later.

Reference numeral 213 denotes a beacon control unit which controls the transmission timings of a beacon (notification signal). A beacon transmission algorithm in an ad hoc network of an IEEE802.11 wireless LAN will be described below.

Beacons are transmitted in an autonomous distributed manner in the ad hoc network among all apparatuses which configure the network. A beacon transmission interval (beacon cycle) is determined by an apparatus which created the ad hoc network first, and beacons are normally transmitted from arbitrary apparatuses at an interval of about 100 ms. Note that the ad hoc network is formed when one arbitrary apparatus begins to transmit beacons.

The beacon transmission timings are controlled by a parameter called a contention window (a random number generation range; to be abbreviated as CW hereinafter). When a beacon transmission timing is reached, each apparatus in the network calculates a random value (CWrand) within the range from 0 to the CW. A time period obtained by multiplying a predetermined constant interval (slot time) by this CWrand is set as a waiting time period (backoff time period) until beacon transmission.

As the waiting time period until beacon transmission is decremented by the slot time, when the waiting time period reaches zero, a beacon is transmitted. If the apparatus receives a beacon from another apparatus before it transmits a beacon, the apparatus aborts the transmitting processing of a beacon.

With this control, collisions of beacons transmitted from respective apparatuses can be avoided. Since respective apparatuses on the ad hoc network select random numbers within the range from 0 to the CW, an apparatus, which selects a smallest CWrand, of those that configure the network transmits a beacon.

For example, when an identical CW is set in the respective apparatuses as an initial value, the respective apparatuses have equal beacon transmission probabilities and, as a result, the numbers of times beacons are transmitted per unit time by the respective apparatuses become nearly the same. In other words, the transmission frequencies (transmission ratios) of beacons by the respective apparatuses become the same.

On the other hand, when one apparatus on the network sets the CW to be a value smaller than the initial value, the probability that this apparatus transmits a beacon becomes higher than other apparatuses. That is, the CW can be expressed as a parameter used to determine the probability that a beacon is transmitted or the number of times beacons are transmitted per unit time.

Also, the CW can be expressed as a parameter used to determine the transmission ratio of beacons transmitted by each apparatus. Furthermore, the CW can also be expressed as a parameter used to determine the beacon transmission timing or a waiting time period until beacon transmission.

Note that the CW value can be changed within the range from CWmin (minimum value) to CWmax (maximum value). When the CWmin is set, the number of times beacons are transmitted per unit time is maximized. In each apparatus, CWinit (>CWmin) is set as an initial value, and beacons are transmitted using the initial value while no automatic communication parameter setting processing is executed.

Figure 3:
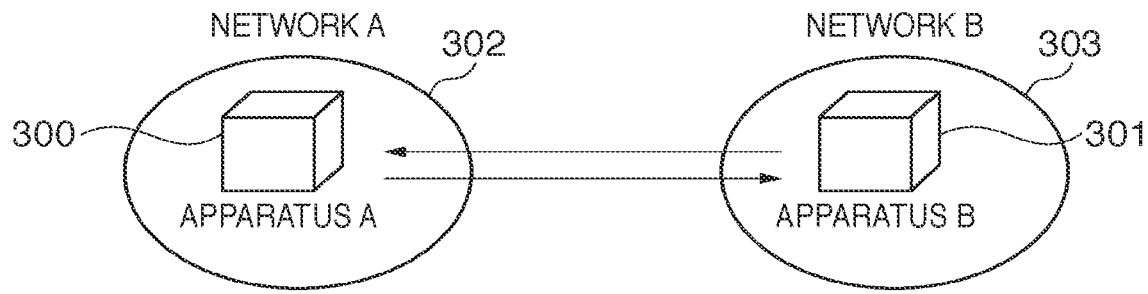
FIG. 3 is a diagram showing the first network arrangement according to the embodiment of the present invention.

FIG. 3 is a diagram showing a communication apparatus A 300 (to be referred to as apparatus A hereinafter) and communication apparatus B 301 (to be referred to as apparatus B hereinafter). All these apparatuses have the arrangements shown in FIGS. 1 and 2 described above.

Both apparatuses A and B respectively create a network A 302 (to be referred to as network A hereinafter) and a network B 303 (to be referred to as network B hereinafter) in a state in which whether they serve as a communication parameter providing apparatus or a receiving apparatus is not determined.

Apparatuses A and B discover each other's apparatus, and determine which apparatus serves as a providing apparatus. As a result, the apparatus which serves as the providing apparatus provides communication parameters to that which serves as the receiving apparatus.

Networks A and B are ad hoc networks respectively created by apparatuses A and B. The ad hoc network is called an IBSS (Independent Basic Service Set), and respective networks are distinguished using BSSIDs as network identifiers. The BSSID is a network identifier which assumes a random value generated by an apparatus that creates a network. Note that an SSID is a network identifier which can be set in advance in an apparatus or can be set to be an arbitrary value by the user, and is different from the BSSID. As can be seen from the above description, the BSSID is not a communication parameter which is provided from the providing apparatus to the receiving apparatus by the automatic communication parameter setting processing.

Figure 4:
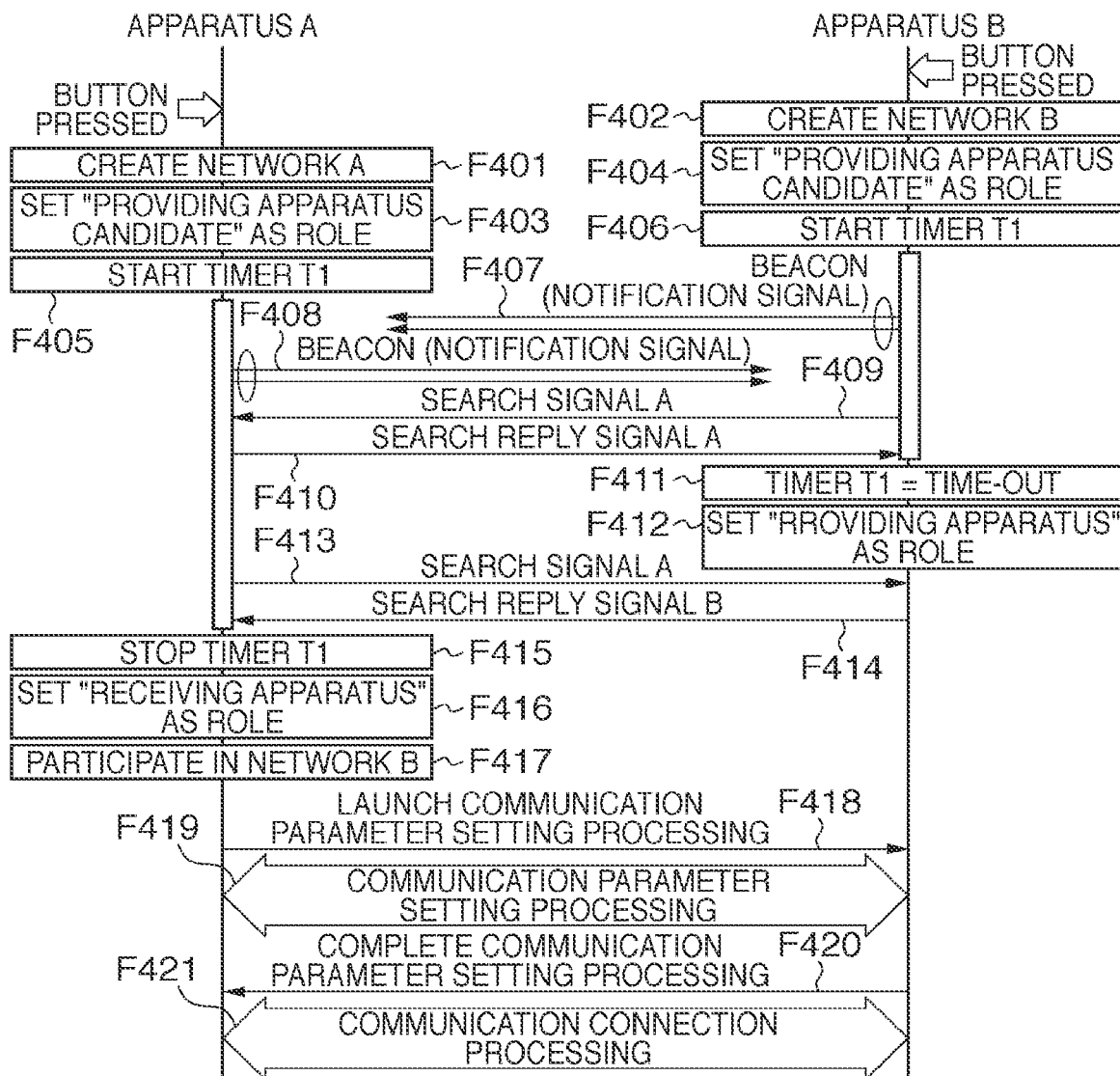
FIG. 4 is a sequence chart showing the operations of apparatuses A and B according to the embodiment of the present invention.

FIG. 4 is a chart showing an example of the processing sequence when the setting buttons 106 are pressed on apparatuses A and B, and the automatic communication parameter setting processing is executed between apparatuses A and B.

When the setting buttons 106 are respectively pressed on apparatuses A and B, apparatus A creates unique network A (F401), and apparatus B also creates unique network B (F402). Assume that the setting button 106 of apparatus B is pressed earlier, and apparatus B creates a network first.

Each of apparatuses A and B is set as "providing apparatus candidate" indicating that their operation role (to be referred to as a role hereinafter) is settled neither as a providing apparatus nor a receiving apparatus (F403, F404), and starts a timer T1 as a limit time until the operation role is determined (F405, F406).

Apparatuses A and B transmit beacons (notification signals) (F407, F408). A beacon signal includes an information element which notifies that the apparatus has a automatic communication parameter setting processing function in the created network or the automatic setting processing is in progress. Also, the beacon may also include an information element indicating "providing apparatus candidate" as the current role.

Since these beacons include different BSSIDs in correspondence with networks A and B, the apparatus which received the beacon can recognize a network to which the transmission source apparatus of that beacon belongs.

Subsequently, apparatus B transmits search signal A (F409). The search signal A also includes an information element indicating that the apparatus has a automatic communication parameter setting processing function or the automatic setting processing is in progress, and an information element indicating "providing apparatus candidate" as the current role, as in the beacon.

Upon reception of search signal A transmitted from apparatus B, apparatus A transmits search reply signal A to apparatus B (F410). The search reply signal A also includes an information element indicating that the apparatus has a automatic communication parameter setting processing function or the automatic setting processing is in progress, and an information element indicating "providing apparatus candidate" as the current role, as in the beacon and search signal A.

When the timer T1 of apparatus B has reached a time-out before no providing apparatus is detected (F411), apparatus B sets "providing apparatus" as its operation role (F412).

Apparatus A transmits search signal A in turn (F413). Search signal A transmitted from apparatus A also includes an information element indicating that the apparatus has a automatic communication parameter setting processing function or the automatic setting processing is in progress, and an information element indicating "providing apparatus candidate" as the current role.

Upon reception of search signal A transmitted from apparatus A, apparatus B transmits search reply signal B to apparatus A (F414). Search reply signal B includes an information element indicating that the apparatus has a automatic communication parameter setting processing function or the automatic setting processing is in progress, and the current role, as in the beacon and search signal A. At this time, since apparatus B determines "providing apparatus" as its operation role, search reply signal B includes an information element indicating "providing apparatus". In addition to the information element indicating "providing apparatus" as the role, an information element indicating that the apparatus is ready to provide communication parameters may be added.

Apparatus A receives search reply signal B transmitted from apparatus B, and confirms that the role of apparatus B is "providing apparatus", and apparatus B is ready to provide communication parameters. Hence, apparatus A stops the timer T1 (F415), sets "receiving apparatus" as its role (F416), and participates in network B created by apparatus B (F417). Then, apparatuses A and B can exchange communication messages (protocol messages) to be exchanged in communication parameter automatic setting protocol processing.

Note that the automatic setting protocol processing means processing which exchanges various communication messages that are set in advance to provide communication parameters from a providing apparatus to a receiving apparatus. Note that the WPS calls this protocol processing as "Registration protocol" (see non-patent reference 1). In the following description of this embodiment, for the sake of simplicity, the receiving apparatus transmits a communication parameter setting launch message to the providing apparatus, and the providing apparatus executes communication parameter providing processing to the receiving apparatus in response to this message. Then, upon completion of the communication parameter providing processing, the providing apparatus transmits a communication parameter setting completion message.

When apparatus A participates in network B in F417, since communication parameters such as an encryption key and authentication key are not set in apparatus A, apparatuses A and B cannot make communications using encryption and authentication.

Note that upon determining the role of the communication parameter providing apparatus or receiving apparatus between apparatuses A and B, the search signal and search reply signal are used.

However, in place of exchanging the search signal and search reply signal, the roles may be determined using information of beacons which are exchanged with each other.

When apparatus A participates in the network created by apparatus B, it transmits a communication parameter setting launch message to apparatus B (F418), and apparatus B as the providing apparatus executes communication parameter providing processing to apparatus A as the receiving apparatus (F419). Upon completion of the communication parameter providing processing, apparatus B transmits a communication parameter setting completion message to apparatus A (F420). Then, the communication parameter setting processing is complete, and communication parameters are shared between apparatuses A and B.

Then, apparatuses A and B execute communication connection processing using the shared communication parameters (F421).

Note that since the communication connection processing is started simultaneously with the end of the communication parameter setting processing, apparatuses A and B can communicate with each other without forcing the user to make any operation. In this case, an apparatus may transmit a connection request signal which explicitly indicates the start of the communication connection processing. In the ad hoc mode, although no association processing is executed unlike in an infrastructure mode, the apparatus as a request source of connection can be promptly recognized upon reception of the connection request signal.

In this embodiment, apparatus B transmits communication parameters of network B to apparatus A, and the communication connection processing is executed using these communication parameters. In this case, when apparatus A transmits a connection request signal to apparatus B, apparatus B can detect that apparatus A participates in network B, and can also easily obtain the number of participants.

Before the start of the communication connection processing, the apparatus may confirm the user whether or not to start connection, and may start the communication connection processing in accordance with a user's operation. For example, upon completion of the communication parameter setting processing, the display unit 105 may display a message which prompts the user to select whether or not to start connection, and the communication connection processing may be started in accordance with a user's input from the input unit 109.

Apparatus B may transmit, to apparatus A, communication parameters which indicate a network different from network B. For example, apparatus B may provide communication parameters required to communicate using network C to apparatus A, and apparatuses A and B may communicate with each other using network C after the providing processing. In this case, apparatus A or B may start the communication connection processing in response to detection of the other apparatus on network C as a trigger.

Figure 8:
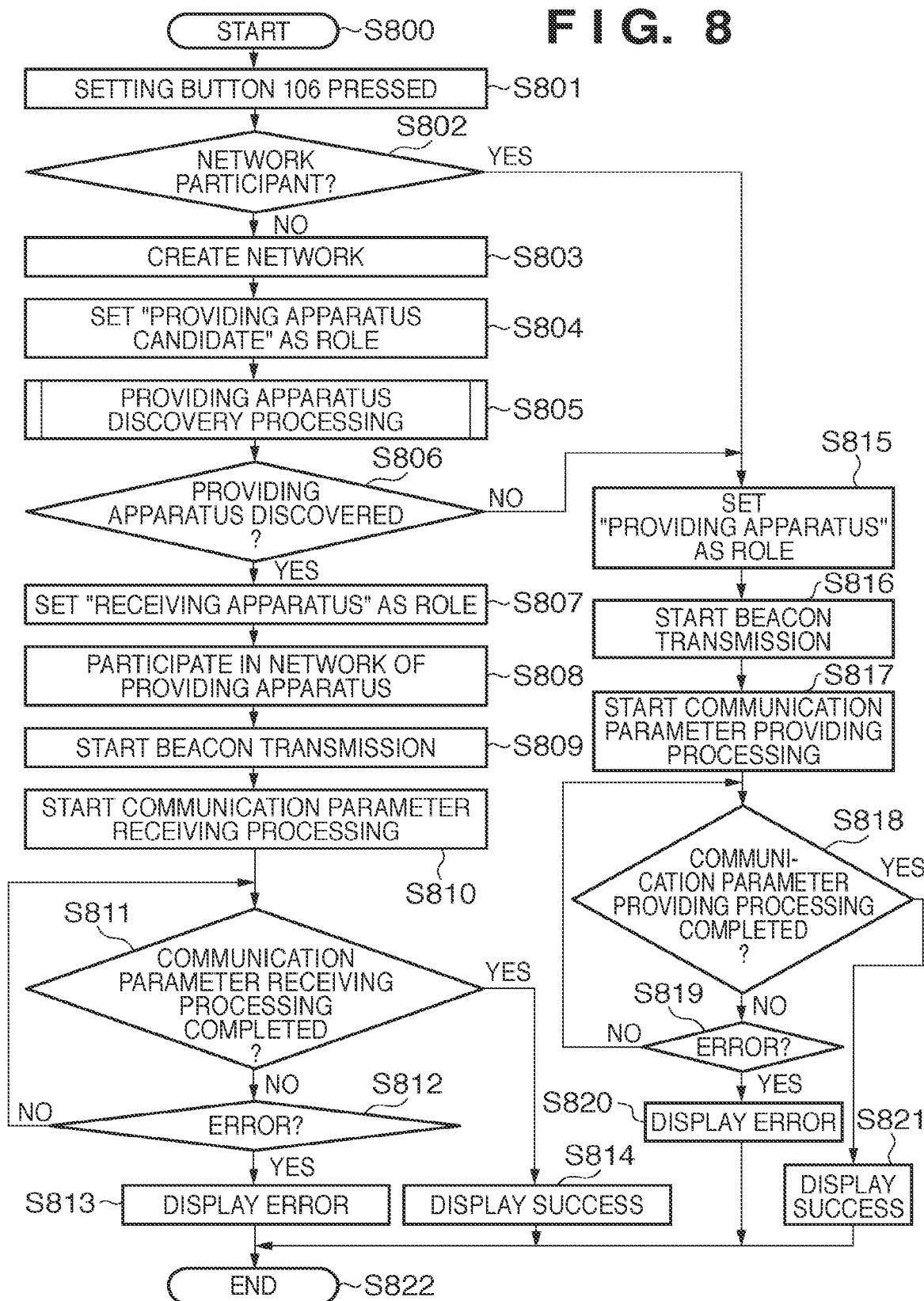
FIG. 8 is a flowchart showing a communication parameter automatic setting operation according to the embodiment of the present invention.

FIG. 8 is a flowchart showing an example of the operation sequence executed when the setting buttons 106 are pressed on apparatuses A and B, the operation roles of apparatuses A and B, that is, the providing apparatus and receiving apparatus are determined, and the automatic communication parameter setting processing is then executed.

Control executed by these two apparatuses will be described below with reference to this flowchart.

The setting button 106 is pressed to indicate the start of communication parameter setting processing (S801).

The apparatus on which the setting button 106 has been pressed checks if it is already a participant of a network at present (S802). The apparatus is a participant of a network when it configures the network using communication parameters shared by communication parameter setting processing which has already been done with another apparatus. If the apparatus is already a participant of the network, it sets "providing apparatus" as its role so as to control another new apparatus to participate in the participating network (S815). The apparatus then begins to transmit beacons including, e.g., information indicating that the role is "providing apparatus" (S816).

After that, upon reception of a communication parameter setting launch message from a new apparatus as a prospective participant of the network, the apparatus starts communication parameter providing processing (S817). That is, in the communication parameter providing processing started in step S817, when the apparatus is already a participant of the network, the apparatus provides communication parameters of the network of which that apparatus is a participant. Note that when the apparatus is already a participant of the network at present, it launches start notification processing shown in FIG. 6 (to be described later). Assume that a beacon (notification signal), search signal (probe request), and search reply signal (probe response) include the following information elements as mandatory elements or options depending on signals:

an information element which notifies that the apparatus has an automatic communication parameter setting processing function or the automatic setting processing is in progress;

an information element indicating the role of the apparatus; and an information element indicating whether or not a providing function is active.

If it is determined in step S802 that the apparatus does not participate in any network, that apparatus creates a network by itself so as to determine the operation role (S803), sets "providing apparatus candidate" as the role (S804), and launches providing apparatus discovery processing to be described later (S805). Note that the apparatus creates a network on an arbitrary wireless LAN channel in step S803. Note that the wireless LAN channel is a communication channel (frequency channel) authorized to be used in communications of the wireless LAN. For example, in case of a wireless LAN compliant with the IEEE802.11g, communication channels from 1 ch to 13 ch are available in Japan. The providing apparatus discovery processing in step S805 will be described later with reference to FIGS. 17, 19, and 20.

As a result of the providing apparatus discovery processing, if an apparatus which has "providing apparatus" as its role is discovered (S806), the apparatus sets "receiving apparatus" as its role (S807), and participates in a network created by the providing apparatus (S808). After the apparatus participates in the network, the apparatus begins to transmit beacons including information indicating that the role is "receiving apparatus" (S809). Note that since the apparatus does not receive any communication parameters provided from the providing apparatus at this time, it cannot make communications using encryption and authentication in the network in which that apparatus has become a participant. The apparatus which has become a participant of the network transmits a communication parameter setting launch message to the providing apparatus so as to request to provide communication parameters, and starts receiving processing of communication parameters from the providing apparatus (S810).

On the other hand, if an apparatus which has "providing apparatus" as its role cannot be discovered as a result of the providing apparatus discovery processing (S806), the apparatus sets "providing apparatus" as a role of the apparatus (S815). Then, the apparatus begins to transmit beacons including information indicating that the role is "providing apparatus" (S816), and starts communication parameter providing processing upon reception of a communication parameter setting launch message from the receiving apparatus (S817). In the communication parameter providing processing started in step S817, the apparatus provides communication parameters of the network created in step S803 if the apparatus is not a participant of any network.

On the other hand, the apparatus, whose role is "receiving apparatus" and which has started receiving processing of communication parameters from the providing apparatus, confirms if the receiving processing of the communication parameters is complete (S811). If the receiving processing of the communication parameters is complete, that apparatus makes a display indicating a success of the communication parameter setting processing to be identifiable by the user by controlling the display unit 105 to display a message on an LCD, to flicker or light on an LED, to change the color of the LED, or to generate an arbitrary sound (S814), thus ending the processing (S822). If an error has occurred (S812), the apparatus notifies the error to be identifiable by the user by similarly controlling the display unit 105 to display a message on an LCD, to flicker or light on an LED, to change the color of the LED, or to generate an arbitrary sound (S813), thus ending the processing (S822).

On the other hand, the apparatus, whose role is "providing apparatus" and which has started communication parameter providing processing, confirms if the communication parameter providing processing is complete (S818). If the communication parameter providing processing is complete, that apparatus makes a display indicating a success of the communication parameter setting processing to be identifiable by the user by controlling the display unit 105 to display a message on an LCD, to flicker or light on an LED, to change the color of the LED, or to generate an arbitrary sound (S821), thus ending the processing (S822). If an error has occurred (S819), the apparatus notifies the error to be identifiable by the user by controlling the display unit 105 to display a message on an LCD, to flicker or light on an LED, to change the color of the LED, or to generate an arbitrary sound (S820), thus ending the processing (S822).

Figure 17:
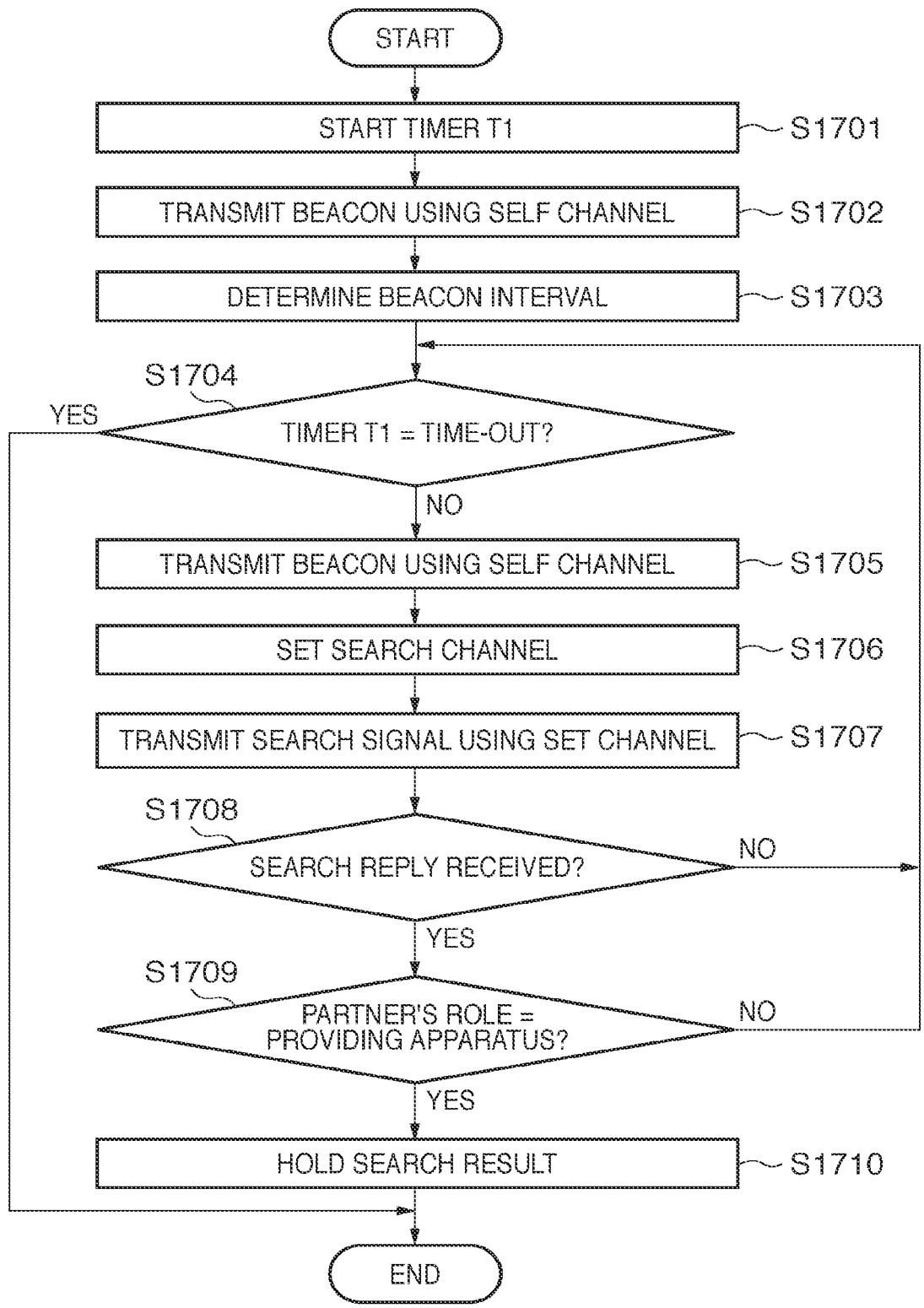
FIG. 17 is a flowchart showing a providing apparatus discovery processing operation according to the first embodiment of the present invention.

FIG. 17 is a flowchart showing an example of the operation sequence upon execution of the providing apparatus discovery processing in step S805 in FIG. 8. The control of the providing apparatus discovery processing will be described below with reference to this flowchart.

When the providing apparatus discovery processing is started, the apparatus starts the timer T1 (S1701). The apparatus transmits beacons (notification signals) on a communication channel on which the network is created (to be referred to as a self channel hereinafter) (S1702). In order to determine the transmission interval of a beacon in the self channel and that of a search signal (probe signal) in other communication channels, the apparatus determines the beacon interval of the self channel (S1703). After the search signal is transmitted (after processing of step S1707 to be described later), the apparatus waits until the next beacon transmission timing determined by the beacon interval.

The apparatus determines whether or not the timer T1 has reached a time-out (S1704). If the timer T1 has not reached a time-out yet, the apparatus transmits a beacon (notification signal) in the self channel (S1705). Note that the beacon transmission period may be determined by the duration of the beacon interval or a random duration longer than that.

The apparatus sets a search channel (S1706). Upon setting the search channel, the apparatus executes, for example, the following processing. In case of a wireless LAN compliant with the IEEE802.11g in Japan, channels from 1 ch to 13 ch can be used as wireless LAN channels. In this embodiment, the channel setting processing is executed as follows. That is, in the first search channel setting processing, 1 ch is set. After that, the channel number is incremented in increments of 1 ch up to 13 ch every time the processing in step S1706 is executed. Then, in the processing in step S1706 after 13 ch is set, 1 ch is set again. Note that in the US, since channels 1 ch to 11 ch are available, when the setting processing is executed in turn from 1 ch as in Japan, 1 ch is set again in next step S1706 after 11 ch is set.

In addition to the method of changing channels in increments of one channel, a method of intermittently changing channels is also available. Owing to the radio property of the IEEE802.11g, since a radio wave leaks to neighboring channels albeit weakly, a search signal transmitted in one of the neighboring channels can be received, and a reply signal can be returned. Hence, in the first channel setting processing, 2 ch is set as a search channel, and a bandwidth from 1 ch to 3 ch can be searched. That is, a communication partner apparatus is searched over a bandwidth of three channels to have the set communication channel as the center. Likewise, in the second channel setting processing, 5 ch is set to search a bandwidth from 4 ch to 6 ch. After that, 8 ch is set in the third processing, 11 ch is set in the fourth processing, and 13 ch is set in the fifth processing. In the sixth processing, the channel to be set is returned to 2 ch. Such search channel setting method can be used.

Note that the channel selection may adopt a random setting order in place of the aforementioned sequential setting order, or search processing may be executed a plurality of number of times using an identical channel. Furthermore, in addition to the aforementioned methods, channels may be grouped by a predetermined method, and search processing may be executed for respective groups.

As described above, the search channel setting processing in step S1706 is processing which changes a channel to be set according to a predetermined algorithm.

The description will revert to the flowchart shown in FIG. 17. The apparatus transmits a search signal (probe request) onto the communication network using the search channel set in step S1706 (S1707). After transmission of the search signal, the apparatus waits for reception of a search reply until the next beacon transmission timing (S1708). If no search reply is received when the next beacon transmission timing is reached, the process returns to step S1704 to determine the remaining time period of the timer T1. If the timer has not reached a time-out yet, the apparatus repeats processing from beacon transmission using the self channel again.

If a search reply is received in step S1708, the apparatus confirms the contents of the received search reply signal to determine if the role of a partner apparatus is "communication parameter providing apparatus" (S1709). If the role of the partner apparatus is "communication parameter providing apparatus", the apparatus holds the search result (S1710), and ends the providing apparatus discovery processing. If the role of the partner apparatus is not "providing apparatus" as a result of the determination processing in step S1709, the process returns to step S1704 to determine the remaining time period of the timer T1. If the timer has not reached a time-out yet, the apparatus repeats processing from beacon transmission using the self channel again. Note that if the timer T1 has reached a time-out in step S1704, it is determined that no providing apparatus is detected, thus ending the providing apparatus discovery processing.

By executing the aforementioned providing apparatus discovery processing, the beacon transmission using the self channel and the search processing using another channel can be alternately executed.

An example of executing the providing apparatus discovery processing while changing a channel used to transmit a beacon and that used to transmit a search signal and to wait for reception of a search reply signal, and the effect of that processing will be described below with reference to FIGS. 19 and 20.

Figure 19:
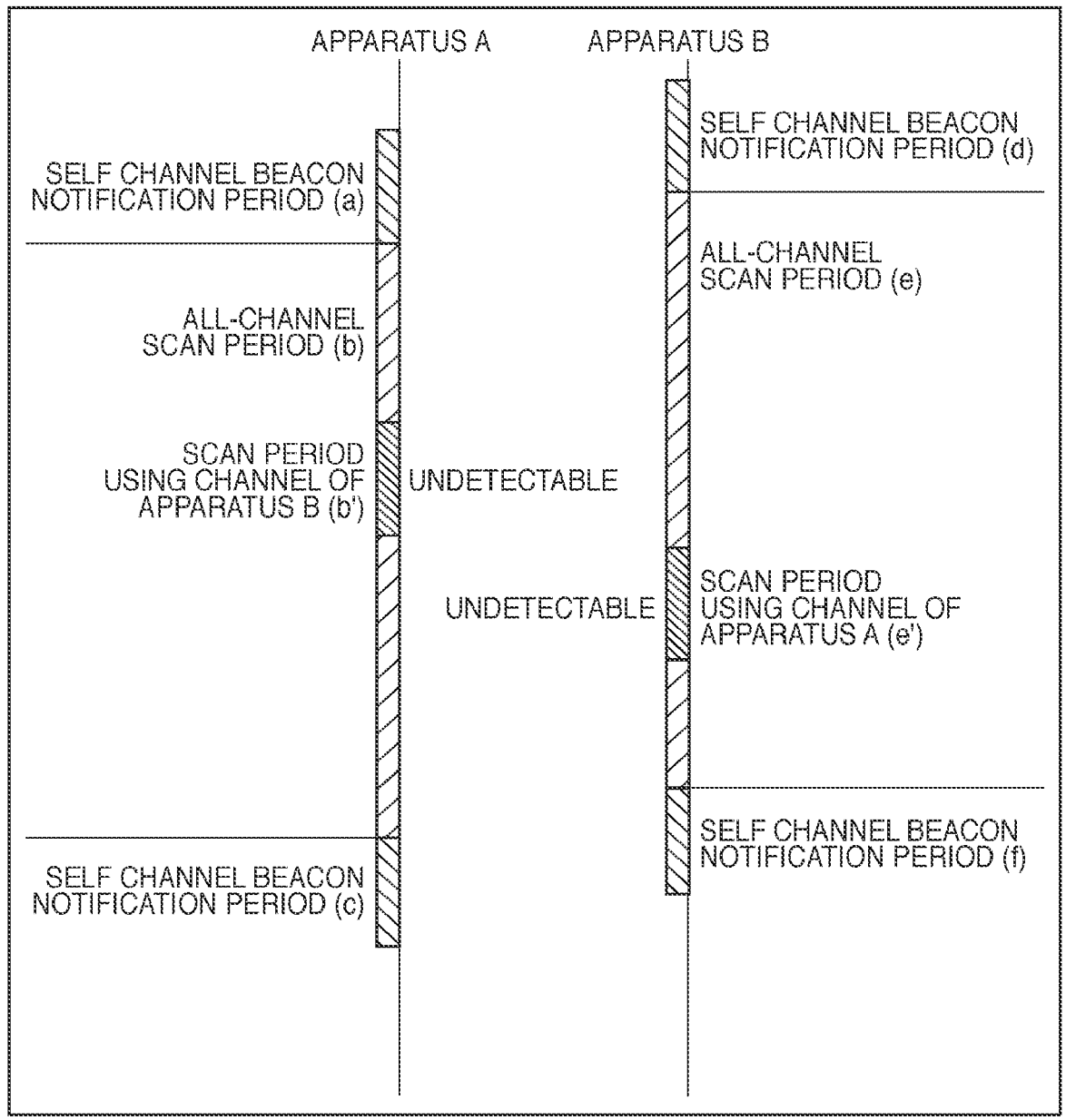
FIG. 19 is a timing chart showing a general providing apparatus discovery processing operation.
Figure 20:
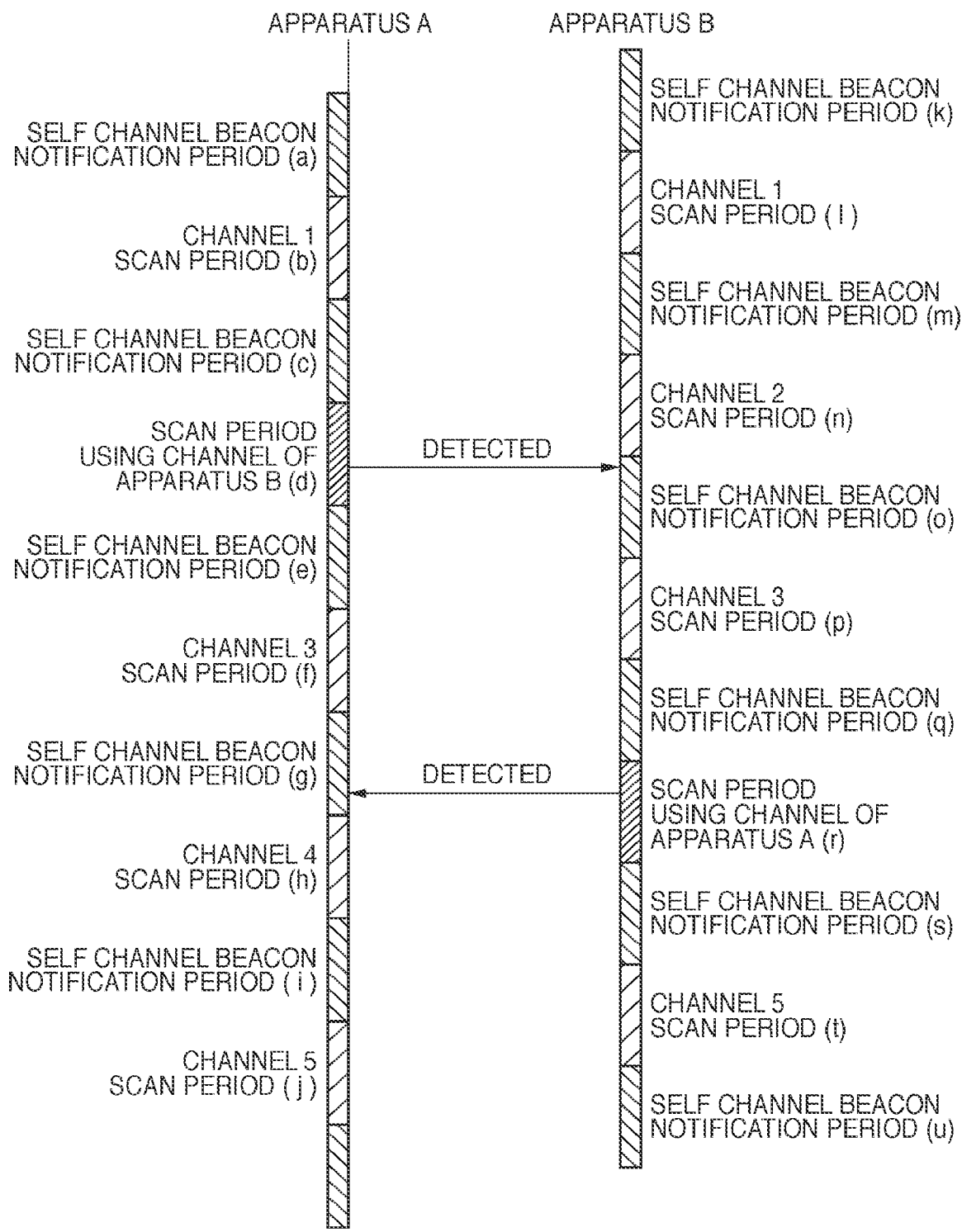
FIG. 20 is a timing chart showing a providing apparatus discovery processing operation according to the present invention.

FIG. 19 is a chart showing an example in which the processing shown in FIG. 17 is not executed, and a providing apparatus is explored while changing a channel in turn after transmission of beacons using the self channel. Apparatus A transmits beacons using the self channel during only a period (a). After that, apparatus A transmits a search signal, and waits for reception of a search reply while changing all channels until a providing apparatus is discovered during a period (b).

On the other hand, apparatus B also transmits beacons using the self channel during only a period (d) as in apparatus A. After that, apparatus B transmits a search signal, and waits for reception of a search reply while changing all channels until a providing apparatus is discovered during a period (e).

Assume that apparatus A transmits a search signal and waits for reception of a search reply signal using a channel in which apparatus B forms a network, during a period (b'). In this case, since apparatus B does not transmit any beacon using the self channel during the period (b'), it cannot receive the search signal from apparatus A, and cannot return any search reply signal.

Likewise, assume that apparatus B transmits a search signal and waits for reception of a search reply signal using a channel in which apparatus A forms a network, during a period (e'). In this case as well, since apparatus A does not transmit any beacon using the self channel during the period (e'), it cannot receive the search signal from apparatus B, and cannot return any search reply signal.

In this way, when both the apparatuses execute the providing apparatus discovery processing, the beacon notification period of the self channel is short, and the interval until a beacon is notified using the self channel is long. Therefore, apparatus A cannot detect apparatus B, and apparatus B cannot detect apparatus A.

Hence, by executing the providing apparatus discovery processing described in this embodiment, the possibility that such situation occurs can be reduced. FIG. 20 is a chart showing an example when apparatuses A and B execute the providing apparatus discovery processing shown in FIG. 17. Apparatus A transmits beacons using the self channel during a period (a). After that, apparatus A executes search processing using the first channel during a period (b). Apparatus A then transmits beacons again using the self channel (c), and executes search processing using the second channel (d). In this way, apparatus A alternately executes the beacon transmission using the self channel, and the search signal transmission and search reply signal reception waiting processing using another channel.

Apparatus B also executes the same processing as in apparatus A. With this processing, for example, the period (d) in which apparatus A executes the search processing using a channel in which apparatus B forms the network overlaps a period (o) in which apparatus B notifies beacons. As a result, when apparatus B returns a search reply signal in response to a search signal transmitted from apparatus A, apparatus A can detect apparatus B.

Likewise, a period (r) in which apparatus B executes the search processing using a channel in which apparatus A forms the network overlaps a period (g) in which apparatus A notifies beacons. As a consequence, when apparatus A returns a search reply signal in response to a search signal transmitted from apparatus B, apparatus B can detect apparatus A.

As described above, by executing the providing apparatus discovery processing described in this embodiment, the probability that a partner communication apparatus is detected can be increased.

Note that FIG. 17 has explained the method in which a providing apparatus which has started the communication parameter setting processing is searched for by waiting for reception of a probe response to a probe request (active scan). Since a providing apparatus which is executing the communication parameter setting processing transmits a beacon added with additional information which means automatic communication parameter setting processing, a receiving apparatus may use a method of waiting for reception of that transmitted beacon for a predetermined period of time (passive scan).

Step S1709 has explained the method in which whether or not the role of a partner included in the information element of the received search reply signal is "providing apparatus" is determined. When the role of a partner included in the information element of the received search reply signal is "providing apparatus candidate", whether or not "providing apparatus" is determined as the role may be determined using information included in the search reply signal. More specifically, for example, an apparatus which transmits a search reply signal transmits the search reply signal which stores an elapsed time period after pressing of the setting button 106. The apparatus which received the search reply signal compares the elapsed time period stored in the search replay signal with an elapsed time period after pressing of its own setting button 106. As a result of comparison, if the setting button 106 of the apparatus that received the search reply signal was pressed earlier than the apparatus that transmitted the search reply signal, the apparatus that received the search reply signal sets "providing apparatus" as the role, and the process advances to step S816.

On the other hand, as a result of comparison, if the setting button 106 of the apparatus which transmitted the search reply signal was pressed earlier than the apparatus which received the search reply signal, the apparatus which received the search reply signal transmits a notification signal to the apparatus that transmitted the search reply signal, and the apparatus which received the notification signal may set "providing apparatus" as the role.

As described above, when the search reply signal includes a time at which a user operation was made to issue a start instruction of the communication parameter setting processing, and the discovered communication partner apparatus is not settled as a providing apparatus, which apparatus is a providing apparatus can be determined with reference to that time. When the time included in the search reply signal is earlier than a time at which the start instruction of the communication parameter setting processing was issued to the apparatus which received the search reply signal, the communication partner apparatus is determined as a providing apparatus. With this processing, a providing apparatus can be determined promptly. Note that information to be compared is not limited to the elapsed time period after pressing of the button 106. For example, the MAC address of the apparatus may be compared, or a Timing Synchronization Function (TSF) value included in the search reply signal may be compared.

A case will be described below wherein a new apparatus is added to an already existing ad hoc network using the automatic communication parameter setting processing. Note that the already existing ad hoc network indicates an ad hoc network which is configured by a plurality of apparatuses using communication parameters shared between the apparatuses which executed the communication parameter setting processing.

Figure 5:
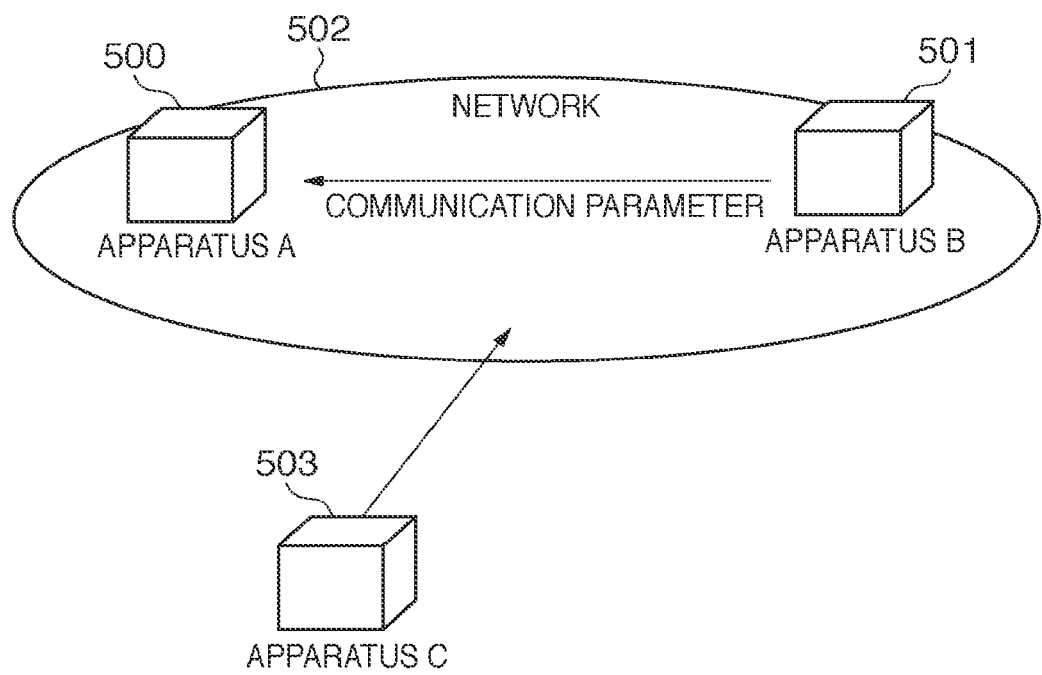
FIG. 5 is a diagram showing the second network arrangement according to the embodiment of the present invention.

FIG. 5 is a diagram showing a first communication apparatus A 500 (to be referred to as apparatus A hereinafter), second communication apparatus B 501 (to be referred to as apparatus B hereinafter), third communication apparatus C 503 (to be referred to as apparatus C hereinafter), and network 502. Apparatuses A, B, and C have the aforementioned arrangements shown in FIGS. 1 and 2.

A case will be examined below wherein when apparatus C is about to participate in the network 502 configured by apparatuses A and B, the setting buttons of apparatuses B and C are operated.

Figure 6:
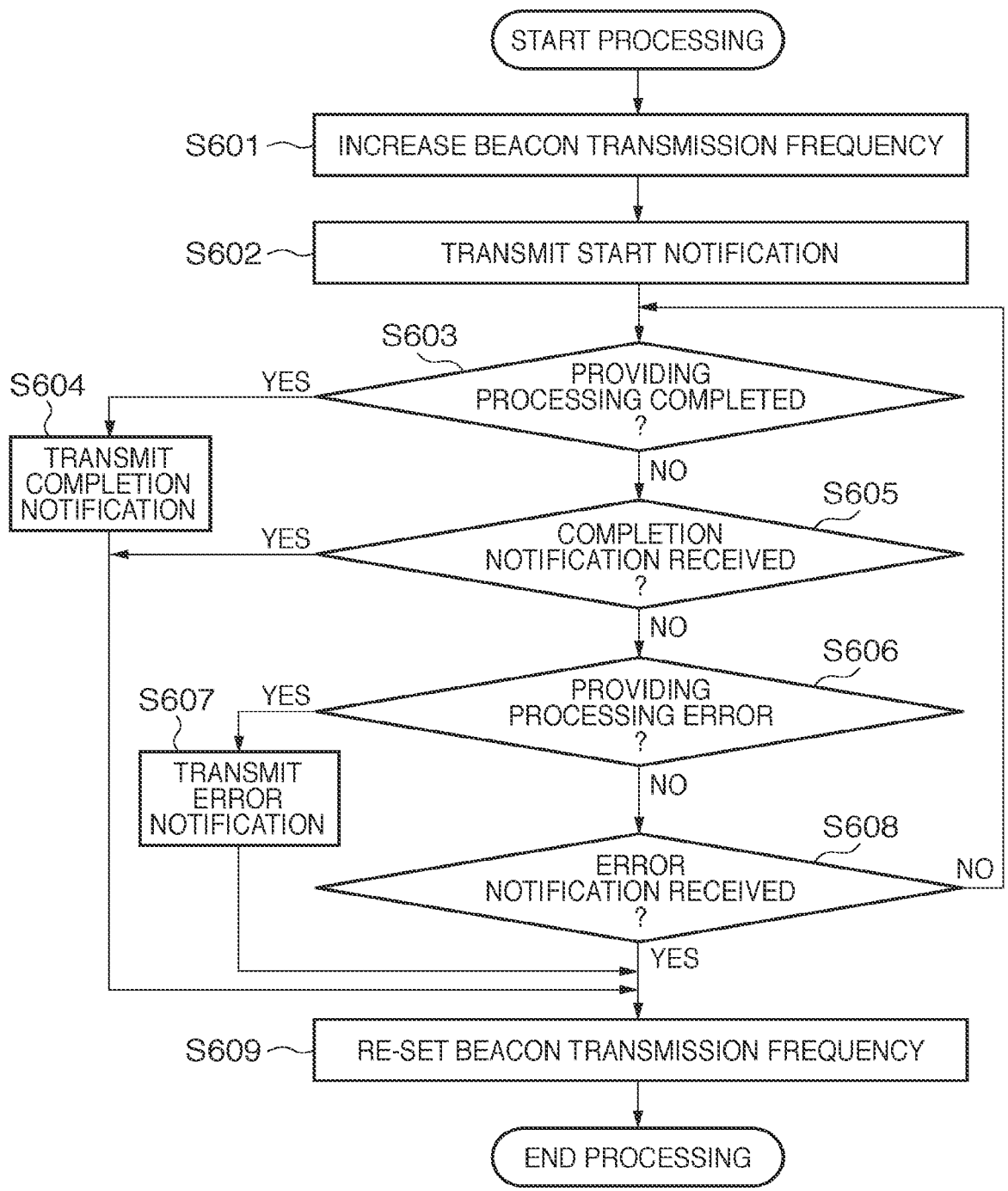
FIG. 6 is a flowchart showing the notification processing operation of a providing apparatus according to the embodiment of the present invention.

FIG. 6 is a flowchart for explaining the notification processing operation of a providing apparatus. When an apparatus is already a participant of the network in step S802 in FIG. 8, that apparatus starts the processing shown in FIG. 6.

When the processing is started, the beacon control unit 213 of the providing apparatus increases the beacon transmission frequency (transmission ratio, the number of times of transmission) per unit time by the providing apparatus (S601).

Note that the ad hoc network of the IEEE802.11 wireless LAN specifies that an apparatus which returns a probe response is an apparatus which transmitted a beacon immediately before reception of a probe request.

Then, in step S601 the providing apparatus sets the CW to be a value smaller than the initial value. With this setting, the number of times beacons are transmitted per unit time by the providing apparatus becomes larger than other apparatuses which are participants of the network. As a result, in the providing apparatus search processing (step S805 in FIG. 8) by a new apparatus as a prospective participant, a probe response from the providing apparatus can be detected within a short period of time.

In this manner, since the beacon transmission frequency of the providing apparatus is increased, when a new apparatus as a prospective participant searches for a providing apparatus, it can receive a probe response from the providing apparatus at a higher probability. When the new apparatus as a prospective participant searches for a providing apparatus by a passive scan, it can receive a beacon from the providing apparatus at a higher probability.

As a result, the probability that the limit time of the communication parameter setting processing elapses while a new apparatus as a prospective participant cannot detect the providing apparatus can be reduced. When the new apparatus as the prospective participant can detect a providing apparatus within a short period of time, a time period required until completion of the communication parameter providing processing can be shortened.

After that, the providing apparatus broadcasts a start notification message that notifies the start of the automatic communication parameter setting processing (S602). Note that the providing apparatus may unicast this start notification message to each apparatus as a participant of the network. This start notification message can also be expressed as a message which notifies that apparatus B started an operation as a providing apparatus.

The providing apparatus waits until the launched providing processing is terminated as an error (S606), the communication parameter providing processing to the receiving apparatus is complete (S603), or it receives an error notification or completion notification message from another apparatus (S605, S608).

If the providing processing has succeeded, that is, if the communication parameter providing processing to the receiving apparatus is complete (S603), the providing apparatus broadcasts a completion notification message (S604). Note that the providing apparatus may unicast this completion notification message to each apparatus as a participant of the network.

If the providing apparatus transmits the completion notification message in step S604 or it receives a completion notification message from another apparatus (S605), the process jumps to step S609.

If the providing processing has failed (S606), the providing apparatus broadcasts an error notification message (S607). Note that the providing apparatus may unicast the error notification message to each apparatus as a participant of the network.

If the providing apparatus transmits the error notification message in step S607 or it receives an error notification message from another apparatus (S608), the process advances to step S609.

In step S609, the beacon control unit 213 of the providing apparatus re-sets the CW to be the initial value to restore the beacon transmission frequency increased in step S601 (S609). Note that the re-setting timing of the CW to the initial value is not particularly limited as long as the CW is re-set after the beginning of the providing processing. That is, the CW may be re-set immediately after the beginning of the processing, after completion of the providing processing, or after an error. If the CW is re-set immediately after the beginning of the processing, since the beacon transmission frequency (the number of times of transmission) is decreased, consumption power required for beacon transmission can be efficiently reduced. The start notification message transmitted in step S602 is repetitively transmitted until the providing processing is terminated as an error, communication parameters are provided to the receiving apparatus, or a notification message is received from another apparatus.

Figure 7:
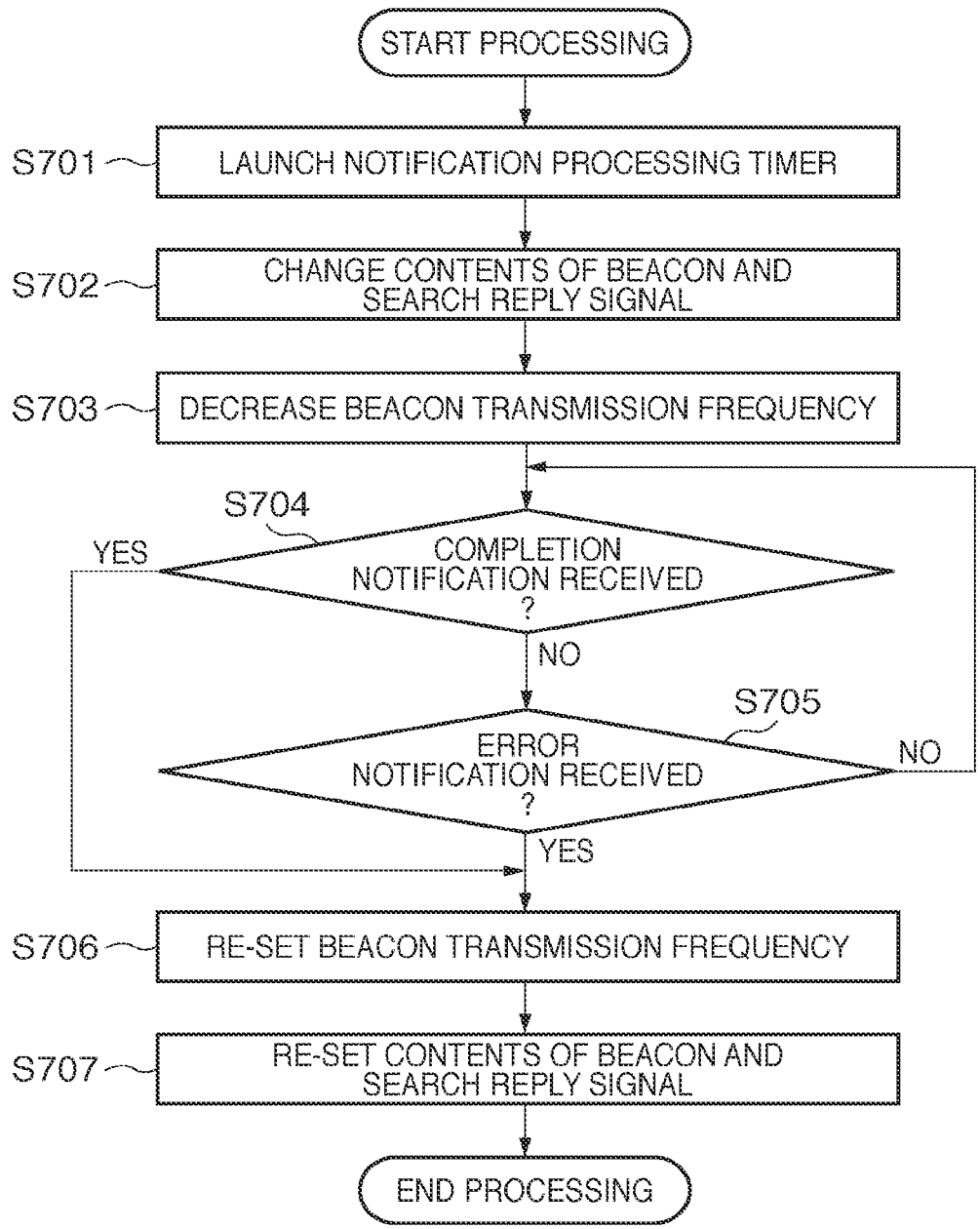
FIG. 7 is a flowchart showing a proxy reply operation according to the embodiment of the present invention.

FIG. 7 is a flowchart for explaining the proxy reply processing operation of an apparatus (apparatus A) as a participant of the network other than the providing apparatus. When apparatus A receives the start notification message, the processing shown in FIG. 7 is started.

Upon detection of reception of the start notification message, the automatic setting control unit 208 of apparatus A launches a timer used to determine if a limit time of processes to be described in steps S702 to S707 has elapsed (S701).

The automatic setting control unit 208 then changes the contents of information to be included in a beacon and search reply signal (probe response) to be transmitted (S702). In step S702, the automatic setting control unit 208 adds identification information used to uniquely identify a providing apparatus (apparatus B) to the beacon and search reply signal to be transmitted. As the identification information, for example, MAC address information of the providing apparatus is stored. In this way, even when apparatus A which is not a providing apparatus returns a search reply signal, an apparatus as a transmission source of a search signal can detect the presence of a providing apparatus.

The beacon control unit 213 sets the CW to be a value larger than the initial value (S703) to decrease the beacon transmission frequency (transmission ratio).

Hence, the number of times beacons are transmitted per unit time by the apparatus as a participant of the network other than the providing apparatus is smaller than the providing apparatus. As a result, in the providing apparatus search processing (step S805 in FIG. 8) by a new apparatus as a prospective participant, a probe response from the providing apparatus can be detected within a short period of time.

After that, apparatus A waits for a completion notification message or error notification message transmitted from the providing apparatus (S704, S705). Upon reception of the notification message, the beacon control unit 213 of apparatus A re-sets (restores) the CW to be the initial value to restore the beacon transmission frequency decreased in step S703 (S706). Furthermore, the automatic setting control unit 208 restores the contents of information to be included in a beacon and search reply signal to be transmitted to those before change in step S702 (S707). That is, the automatic setting control unit 208 removes the identification information which is used to uniquely identify the providing apparatus (apparatus B) and is added to the beacon and search reply signal to be transmitted.

Note that if the timer set in step S701 has reached a time-out, the receiving apparatus aborts the processes in steps S702 to S707. If the processes in steps S702 and S703 have already been done at the timer time-out timing, the re-setting processing is executed as in steps S706 and S707.

Figure 9:
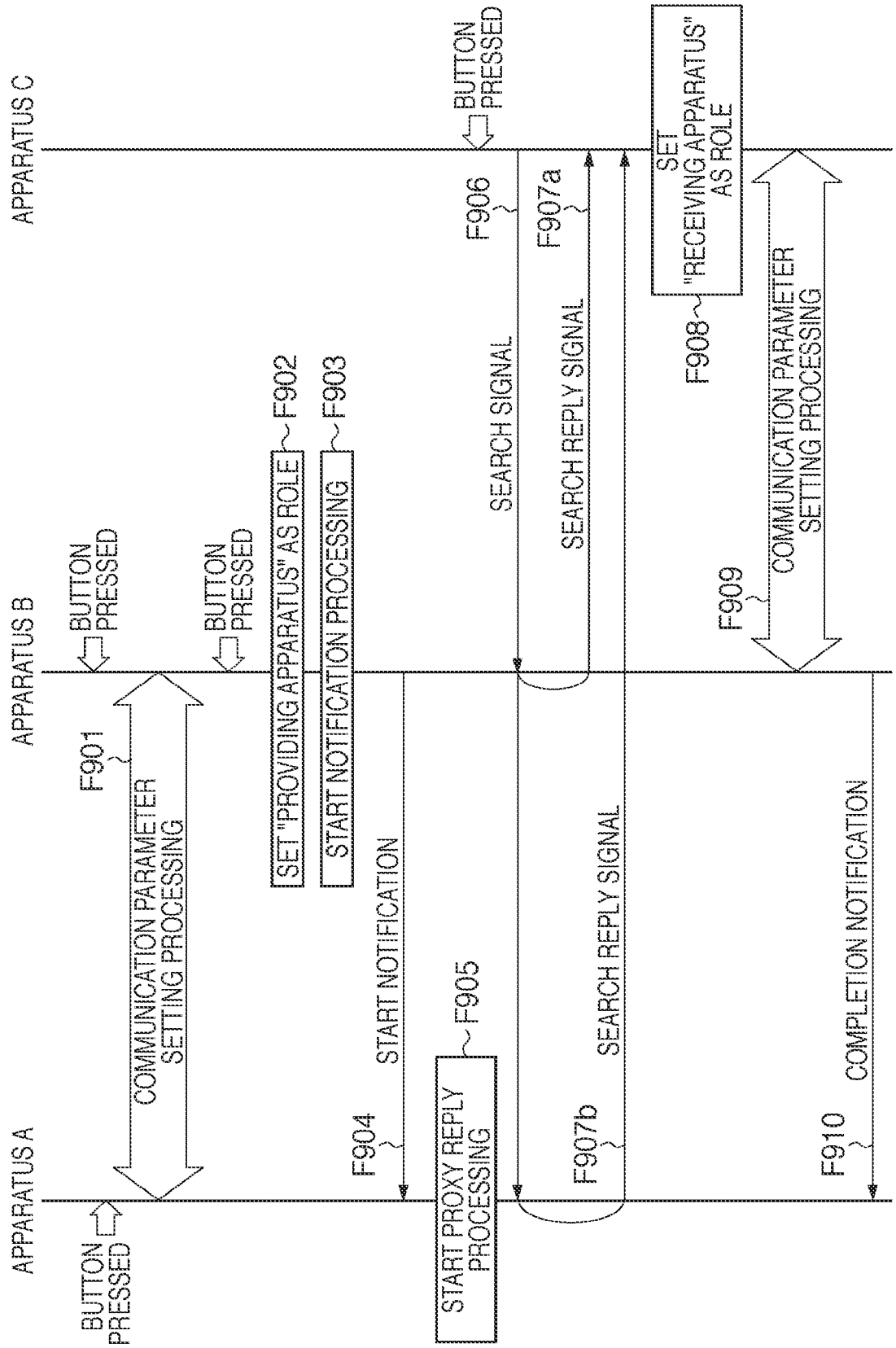
FIG. 9 is a sequence chart showing the operations of apparatuses A, B, and C according to the embodiment of the present invention.

FIG. 9 is a sequence chart for explaining the operations of the respective apparatuses in this embodiment. Apparatus A receives communication parameters provided from apparatus B by the automatic communication parameter setting processing, and is already a participant of the network 502 defined by those communication parameters (F901). Apparatus C has not undergone the communication parameter providing processing yet.

When the user operates the setting button of apparatus B, apparatus B launches the processing shown in FIG. 8 (F902). Since apparatus B is already a participant of the network 502 using the communication parameters shared with apparatus A by the automatic communication parameter setting processing, it sets "providing apparatus" as the role, and starts communication parameter providing processing (F902).

Apparatus B launches the start notification processing shown in FIG. 6 (F903). After the start notification processing is launched, apparatus B transmits a start notification message, and increases the beacon transmission frequency (F904).

Apparatus A which received the start notification message launches the proxy reply processing shown in FIG. 7, and decreases the beacon transmission frequency (F905).

In this manner, when apparatus B increases the beacon transmission frequency and apparatus A decreases the beacon transmission frequency, apparatus C as a new prospective participant can detect apparatus B as the providing apparatus within a shorter period of time.

When the user operates the setting button 106 of apparatus C, apparatus C launches the processing shown in FIG. 8. Since apparatus C is not a participant of the network, it executes processing for creating a network, setting "providing apparatus candidate" as its role, and so forth, and then starts providing apparatus search processing. Note that FIG. 9 shows the search processing and subsequent processes, and does not show processes before them. Apparatus C transmits a search signal so as to detect a providing apparatus (F906).

On the network 502, apparatus A or B returns a search reply signal in response to the search signal transmitted from apparatus C (F907a, F907b).

When apparatus A returns the search reply signal, it returns the search reply signal which stores the identification information (MAC address) of apparatus B as a providing apparatus (F907b). When apparatus B returns the search reply signal, it returns the search reply signal which stores information indicating that it is a providing apparatus (F907a). In this way, even when apparatus C receives the search reply signals from any apparatuses on the network 502, it can surely detect apparatus B as the providing apparatus.

Upon detection of the presence of the providing apparatus, apparatus C sets "receiving apparatus" as its role (F908). Then, apparatus C participates in the network 502, and receives communication parameters required to make communications on the network 502 from apparatus B as the providing apparatus (F909).

After apparatus B provides the communication parameters to apparatus C, it transmits a completion notification message to apparatus A (F910). After transmission of the completion notification message, apparatus B restores the beacon transmission frequency increased in F903. Upon reception of the completion notification message, apparatus A restores the beacon transmission frequency decreased in F905.

As described above, the user can automatically control apparatus C to participate in the network 502 by operating only the setting button 106.

Note that FIG. 9 has explained the case in which the setting button 106 of apparatus B is operated. Also, a case in which the setting button 106 of apparatus A is operated may be assumed. Even when the setting button 106 of apparatus A is operated, since apparatus A becomes the providing apparatus via step S802 in FIG. 8, it can add apparatus C to the network 502 in the same manner as in FIG. 9.

With the aforementioned processing, the communication apparatuses can easily share the communication parameters. As described above, by operating the setting buttons 106 on apparatuses A and B, communication connection processing is executed between apparatuses A and B to configure the network 502.

The communication connection processing may be automatically started after completion of the communication parameter setting processing, as described above, or it may be started in response to a re-pressing operation of the setting button 106 or a connection command entry by the input unit 109.

Note that the communication connection processing differs depending on the authentication method and encryption method of the shared communication parameters.

In this embodiment, combinations adopted as the authentication method and encryption method are as shown in, for example, FIG. 10.

Open authentication is an authentication method defined as "Open System Authentication" in the IEEE802.11 standard, and please refer to the IEEE802.11 standard for details. Shared authentication is an authentication method defined as "Shared Key Authentication" in the IEEE802.11 and IEEE802.11i standards, and uses a WEP protocol as an encryption method.

Note that "WEP" is an abbreviation for "Wired Equivalent Privacy", and please refer to the IEEE802.11 or IEEE802.11i standard for details. Also, a WPA authentication method, WPA-PSK authentication method, WPA2 authentication method, and WPA2-PSK authentication method are the standards of authentication methods specified by the Wi-Fi Alliance. These methods are based on an RSNA (Robust Security Network Association) in the IEEE802.11i standard.

"TKIP" is an abbreviation for "Temporal Key Integrity Protocol". Also, "CCMP" is an abbreviation for "CTR with CBC-MAC Protocol", and uses an AES protocol as an encryption method. "AES" is an abbreviation for "Advanced Encryption Standard".

Please refer to the Wi-Fi Alliance specification or test specification for details of these methods. The WPA-PSK and WPA2-PSK authentication methods are those using a pre-shared key. The WPA and WPA2 authentication methods require user authentication by an authentication server, which is prepared separately, and acquire an encryption key of a communication channel from the authentication server. Please refer to the IEEE802.11i standard for details of these methods.

The connection processing method differs depending on authentication methods. The authentication methods that can be supported currently include six different methods, that is, the Open authentication, Shared authentication, WPA authentication, WPA-PSK authentication, WPA2 authentication, and WPA2-PSK authentication, as shown in the table. Of these methods, the WPA authentication and WPA2 authentication, and the WPA-PSK authentication and WPA2-PSK authentication are essentially the same authentication methods. For this reason, the WPA and WPA2 authentication methods and the WPA2 and WPA2-PSK authentication methods are considered as the same methods, and four different authentication methods (Open, Shared, WPA, and WPA-PSK) will be explained below.

However, since the WPA authentication requires an independent authentication server which is externally set, and executes authentication processing with that authentication server, complicated processing is required when all communication apparatuses operate on an equal footing like in the present invention. Hence, a description of the WPA authentication will not be given.

In this embodiment, the Open authentication, Shared authentication, and WPA-PSK authentication will be respectively explained below.

The Open authentication will be described first. In the Open authentication, communication apparatuses set communication parameters shared by the automatic communication parameter setting processing, and search for each other's apparatus to configure an IBSS network.

The Shared authentication will be described below. A detailed description of the Shared authentication will not be given since it is included in the IEEE802.11 and IEEE802.11i specifications. Upon carrying out the Shared authentication, a Requester and Responder have to be determined.

In the infrastructure mode, an STA (station) operates as a Requester, and an AP (access point) operates as a Responder. On the other hand, in the ad hoc mode, no AP exists. For this reason, in order to implement the Shared Key Authentication in the IBSS network, the STA has to include a Responder function and a Requester/Responder role determination algorithm.

This Requester/Responder role determination algorithm may adopt the same method as that of a Supplicant/Authenticator role determination algorithm in the WPA-PSK authentication to be described later. For example, in the automatic communication parameter setting processing, a communication parameter providing apparatus may serve as a Responder, and a communication parameter receiving apparatus may serve as a Requester.

Figure 12:
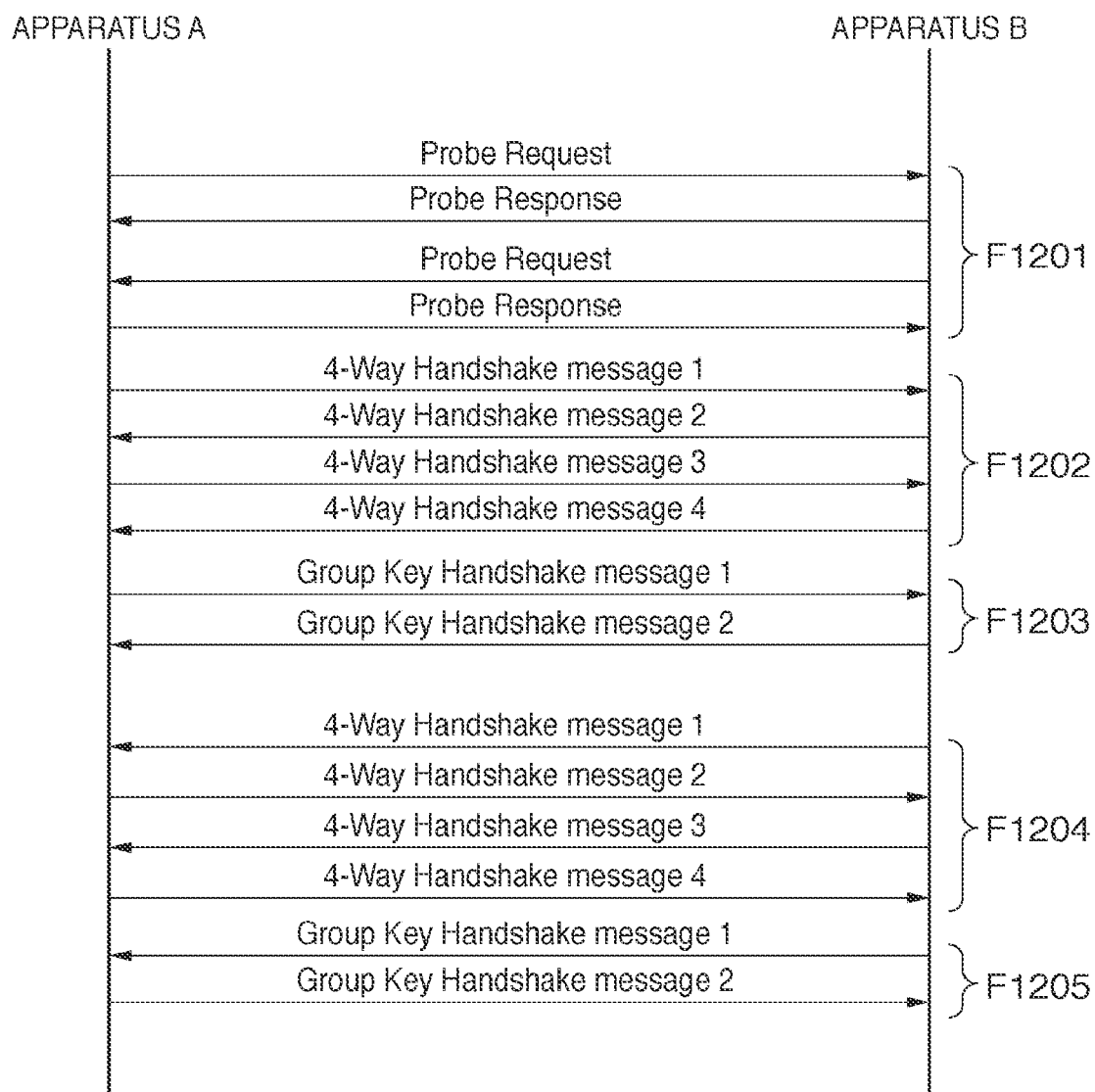
FIG. 12 is a sequence chart (No. 1) of key exchange processing.

Finally, the WPA-PSK authentication will be explained. The WPA-PSK authentication is standardized in the IEEE802.11i and WPA, and an operation method in the IBSS network is also specified. FIG. 12 describes a sequence specified in the IEEE802.11i. Please refer to the IEEE802.11i standard for details, and an overview will be explained below.

Assume that apparatuses A and B which complete the automatic communication parameter setting processing exist. After completion of the automatic communication parameter setting processing, communication connection processing is executed using the automatically set communication parameters automatically or in response to a user operation.

Apparatuses A and B search for each other's partner (F1201). If these apparatuses can recognize with each other, one of apparatuses A and B, which has a larger MAC address, serves as an Authenticator, and the other apparatus serves as a Supplicant. Then, apparatuses A and B execute first 4-way handshake processing and group key handshake processing (F1202 and F1203).

Note that the 4-way handshake processing is a mechanism which exchanges random numbers between the Authenticator and Supplicant, and generates an encryption key of a unicast packet called a pairwise key based on a pre-shared key for each session. The group key handshake processing is a mechanism which sends an encryption key of a multicast packet or broadcast packet possessed by the Authenticator.

After that, apparatuses A and B exchange the roles of the Authenticator and Supplicant, and execute 4-way handshake processing and group key handshake processing again (F1204 and F1205). With the above processes, apparatuses A and B are allowed to make encrypted communications.

In this way, in case of the method fully compliant with the IEEE802.11i specification, since the 4-way handshake processing and group key handshake processing are repeated a plurality of number of times, the overall processing becomes redundant. Since the redundant processing and the role determination algorithm are executed, much time is required until completion of connection. Hence, a method for reducing the redundant processing and shortening a processing time can also be used.

There are some such methods, and in this case, the following four methods will be explained:

First method: 4-way handshake processes are combined into once;

Second method: Group keys are combined into one per network;

Third method: All of group keys and pairwise keys are combined to one; and

Fourth method: Key exchange is executed together in the automatic communication parameter setting processing.

FIG. 11 shows differences of the numbers of times of key exchange sequences and the numbers of possessed pairwise keys and group keys by the aforementioned four methods.

The number of possessed keys will be explained first. When an ad hoc IBSS network including n communication apparatuses is fully compliant with the IEEE802.11i, n−1 pairwise keys as many as the number of other communication apparatuses are required. As for group keys, in addition to group keys as many as the number of other communication apparatuses, a total of two group keys, that is, a current group key and an immediately preceding group key for the apparatus are required. Thus, n+1 group keys are required in total. The reason why the two group keys for the apparatus are required is that an apparatus having different group keys exists in an identical network in a transition period depending on the group key handshake progress status.

In the first method, only the number of sequences is reduced, and the number of possessed keys remains unchanged.

In the second method, n−1 pairwise keys are similarly required, and only one group key is required in all.

In the third method, since a group key is used intact as a pairwise key, the number of pairwise keys becomes zero, and only one group key is possessed.

In the fourth method, n−1 pairwise keys are similarly required. Since respective apparatuses may possess group keys, or one group key in all, n+1 group keys or only one group key may be required on a case-by-case basis.

The number of key exchange sequences executed per other apparatus will be described below. In case of the method fully compliant with the IEEE802.11i, 4-way handshake processing is executed twice and group key handshake processing is executed twice, as has been described using FIG. 12.

In the first method, the number of times 4-way handshake processing is executed as redundant processing is reduced to one. The group key handshake processing is still executed twice.

In the second method, since only one combined group key is used in the network, that key need only be distributed to a new terminal. Hence, the group key handshake processing is executed once. Also, the 4-way handshake processing may be executed once according to the first method, or twice in two ways according to the IEEE802.11i standard.

In the third method, since one key which is set in advance is used as a pairwise key and group key, no key exchange sequence is executed.

In the fourth method, since processing equivalent to key exchange processing is done in the WPS automatic communication parameter setting processing, no independent 4-way handshake processing is executed. The group key handshake processing is executed an arbitrary number of times.

As has been described with reference to FIG. 11, these methods are advantageous in terms of the number of key exchange sequences and the number of possessed keys compared to the aforementioned method fully compliant with the IEEE802.11i standard.

The aforementioned four methods will be described in detail below using the sequence charts.

Figure 13:
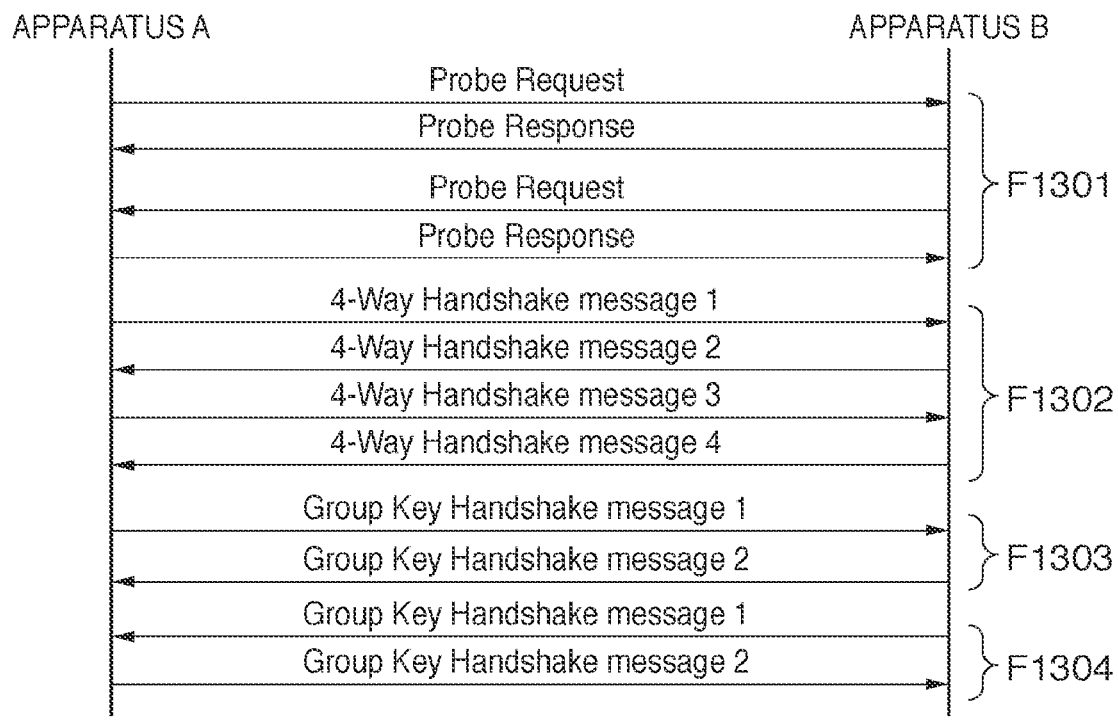
FIG. 13 is a sequence chart (No. 2) of key exchange processing.

The first method will be described below with reference to FIG. 13.

Assume that apparatuses A and B which complete the automatic communication parameter setting processing exist. After completion of the automatic communication parameter setting processing, communication connection processing is executed using the automatically set communication parameters automatically or in response to a user operation.

Apparatuses A and B search for each other's partner (F1301). If these apparatuses can recognize with each other, one of apparatuses A and B, which has a larger MAC address, serves as an Authenticator, and the other apparatus serves as a Supplicant. Then, apparatuses A and B execute 4-way handshake processing and one group key handshake processing (F1302 and F1303).

After that, apparatuses A and B exchange the roles of the Authenticator and Supplicant, and execute the group key handshake processing again (F1304). With the above processing, communications are allowed.

As described above, with the first method, the number of times the 4-way handshake processing is executed, which is twice per apparatus pair in the IEEE802.11i specification, is reduced to one.

Since the 4-way handshake processing is required to share a pairwise key between communication apparatuses which execute 4-way handshake processing, if that processing is continuously executed twice, security cannot be improved, resulting in redundant processing. Hence, in the first method, the conventional method is changed, and the number of times 4-way handshake processing is executed is reduced to one, thereby shortening a time required for normal connection processing.

Figure 14:
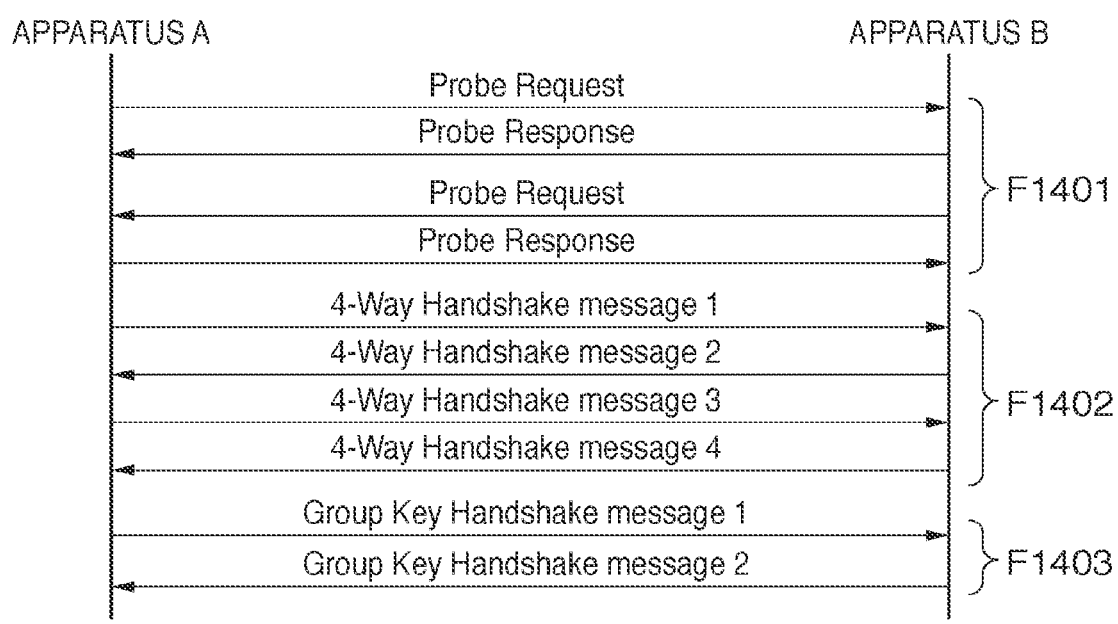
FIG. 14 is a sequence chart (No. 3) of key exchange processing.

The second method will be described below with reference to FIG. 14. Assume that apparatuses A and B which complete the automatic communication parameter setting processing exist. After completion of the automatic communication parameter setting processing, communication connection processing is executed using the automatically set communication parameters automatically or in response to a user operation.

Apparatuses A and B search for each other's partner (F1401). If these apparatuses can recognize with each other, one of apparatuses A and B, which has a larger MAC address, serves as an Authenticator, and the other apparatus serves as a Supplicant. Then, apparatuses A and B execute 4-way handshake processing and group key handshake processing (F1402 and F1403). With the above processing, communications are allowed.

In the IEEE802.11i specification, different group keys are set for respective communication apparatuses. However, in the second method, only one combined group key per network is used.

Pairwise keys are prepared for respective communication channels, but one group key is commonly used per network. As a result, the group key handshake processing, which has to be executed twice in the method compliant with the IEEE802.11i, need only be executed once. Since only one group key is set, the encryption/description processing of a broadcast packet and multicast packet becomes simple because a different key need not be held for each apparatus which transmitted such packets.

The third method is the same as WPA-None (Optional IBSS Global Pre-Shared Key System) described in non-patent reference 2.

Since details of the WPA-None are described in the aforementioned reference, a detail description thereof will not be given. In the normal WPA, a random number is applied to an element as a source of a pairwise key by 4-way handshake processing to generate a session key. On the other hand, in the WPA-None, an element as a source of a pairwise key is applied intact as a session key.

That is, a large characteristic feature of the third method lies in that no key exchange processing is executed. Hence, the security becomes lower than the normal WPA connection processing, which generates a session key for each connection. Hence, when this method is adopted, the automatic communication parameter setting processing is launched for each connection, and communication keys of the shared communication parameters are randomly generated for each connection, thereby improving the security.

Figure 15:
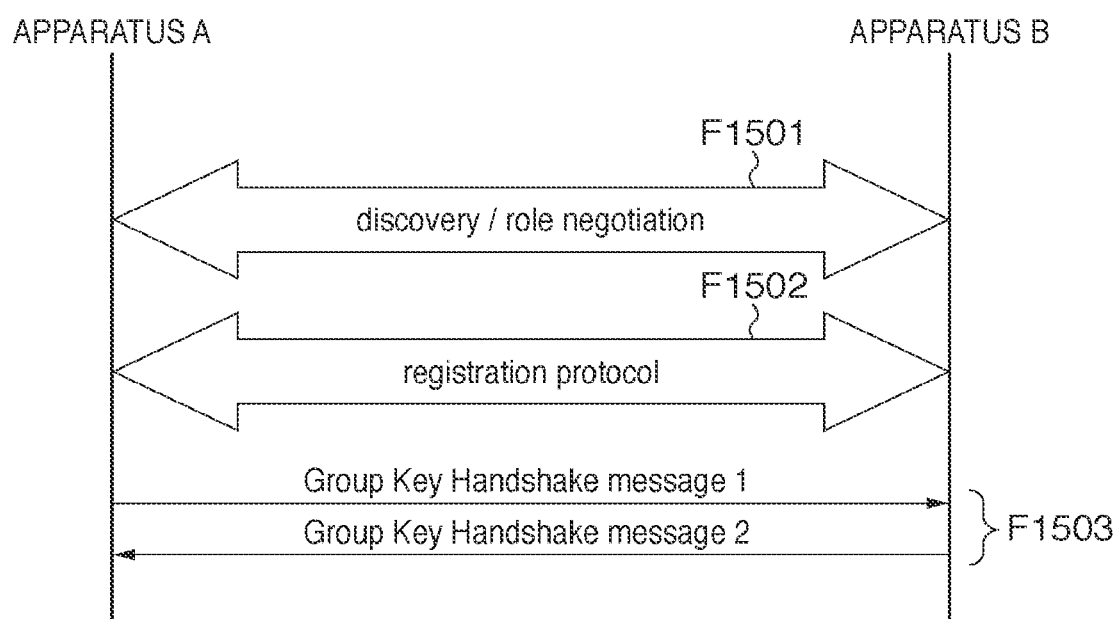
FIG. 15 is a sequence chart (No. 4) of key exchange processing.

The fourth method will be described below with reference to FIG. 15. As described previously using FIG. 4, the communication partner search processing and role determination processing in the automatic communication parameter setting processing are executed (F1501). Subsequently, by the automatic communication parameter setting processing, communication parameters are transferred from a communication parameter providing apparatus to a communication parameter receiving apparatus (F1502). During the processing in F1502, key exchange processing, which is not executed in the conventional method, is executed simultaneously with the communication parameter setting processing.

Upon simultaneous execution, for example, a random number used in message exchange processing of the communication parameter setting processing is also used as that of the key exchange processing. Hence, at the timing when F1502 ends, apparatuses A and B share a pairwise key. After completion of the automatic communication parameter setting processing, group key exchange processing is executed (F1503). As described above, the fourth method is characterized in that the key exchange processing is executed together in the automatic communication parameter setting processing.

With the fourth method, since pairwise keys between apparatuses are different even in an identical network, the security can be improved. Since processing equivalent to 4-way handshake processing is executed in the communication parameter setting processing, the total connection time can be shortened.

In this description, the group key exchange processing is separately executed. However, when the group key exchange processing is also executed in the communication parameter setting processing, the total connection time can be further shortened.

As for the aforementioned five methods including that compliant with the IEEE802.11i, a system may select one of these methods, and information indicating a method to be used included in communication parameters may be provided. Also, these methods may be dynamically switched depending on the mode of automatic communication parameter setting processing.

Figure 16:
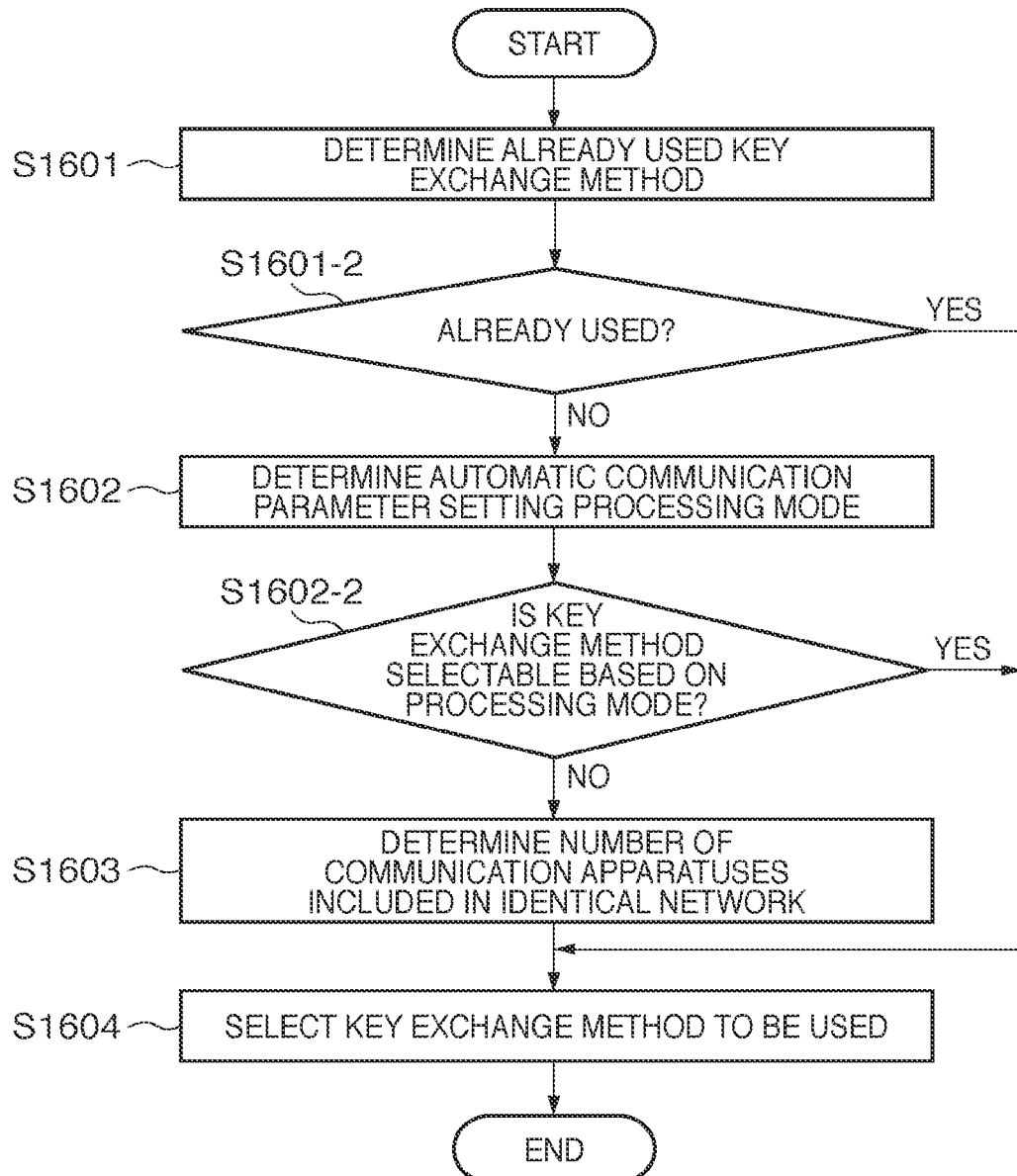
FIG. 16 is a flowchart showing a key exchange algorithm selection algorithm.

A case will be described below with reference to FIG. 16 wherein the methods are dynamically switched depending on the mode of the automatic communication parameter setting processing.

Assume that WPA-PSK, WPA2-PSK, or the like, which requires key exchange processing, is selected as communication parameters by the automatic communication parameter setting processing. In this case, a key exchange method which is already used in a network is determined (S1601). With this determination processing, if an arbitrary key exchange method is already selected (Yes in S1601-2), that method is used intact. If no method is especially selected (No in S1601-2), an automatic communication parameter setting processing mode is determined (S1602).

The processing mode includes, for example, a mode in which communication parameters set by the automatic communication parameter setting processing are permanently used, or the communication parameters are used as temporary session information. For example, in case of the processing mode which permanently uses the set communication parameters (a mode which uses identical communication parameters when a wireless communication is made again after the power supply is turned off), a method which assures high security (e.g., the first method or fourth method) is selected. In case of the mode which uses the communication parameters as temporary session information (a mode which erases or disables the set communication parameters once the power supply is turned off), a method which prioritizes the processing load over security (e.g., the second method or third method) may be selected.

If a key exchange method to be used is not settled based on the processing mode (No in S1602-2), the number of communication apparatuses included in an identical network is determined (S1603). Then, a suited key exchange method is selected based on the number of communication apparatuses (S1604). For example, in case of two communication apparatuses, the method fully compliant with the IEEE802.11i or the first or fourth method is selected. In case of three or more communication apparatuses, the second or third method may be selected.

As described above, according to this embodiment, when the setting button of an apparatus as a participant of a network is operated, that apparatus serves as a providing apparatus and executes communication parameter providing processing. For this reason, when the user selects an arbitrary apparatus without regarding a providing apparatus or receiving apparatus from those as participants of the network, a new apparatus can receive provided communication parameters.

That is, by operating the setting button of an arbitrary apparatus without selecting any providing apparatus, a new apparatus can be added to the network. Since the increased beacon transmission frequency is restored after completion of the providing processing, consumption power required for beacon transmission can be reduced. Note that when the beacon transmission frequency is restored immediately after the beginning of the communication parameter providing processing, consumption power required for beacon transmission can be reduced more efficiently.

When a new apparatus is added to the network after the communication parameters are easily and securely provided, options about key exchange algorithms are increased, and a key exchange algorithm is automatically determined and set, thus lowering user's stress upon forming a network. Also, a network can be securely, easily, and quickly formed.

Second Embodiment

In the first embodiment, in the providing apparatus discovery processing described using FIG. 17, an apparatus alternately executes beacon transmitting processing on its wireless LAN channel, and providing apparatus discovery processing on another wireless LAN channel. With this processing, the apparatus and the other apparatus can easily detect each other's apparatus. By contrast, the second embodiment will explain an example in which the providing apparatus discovery processing is executed on a predetermined wireless LAN channel.

Figure 18:
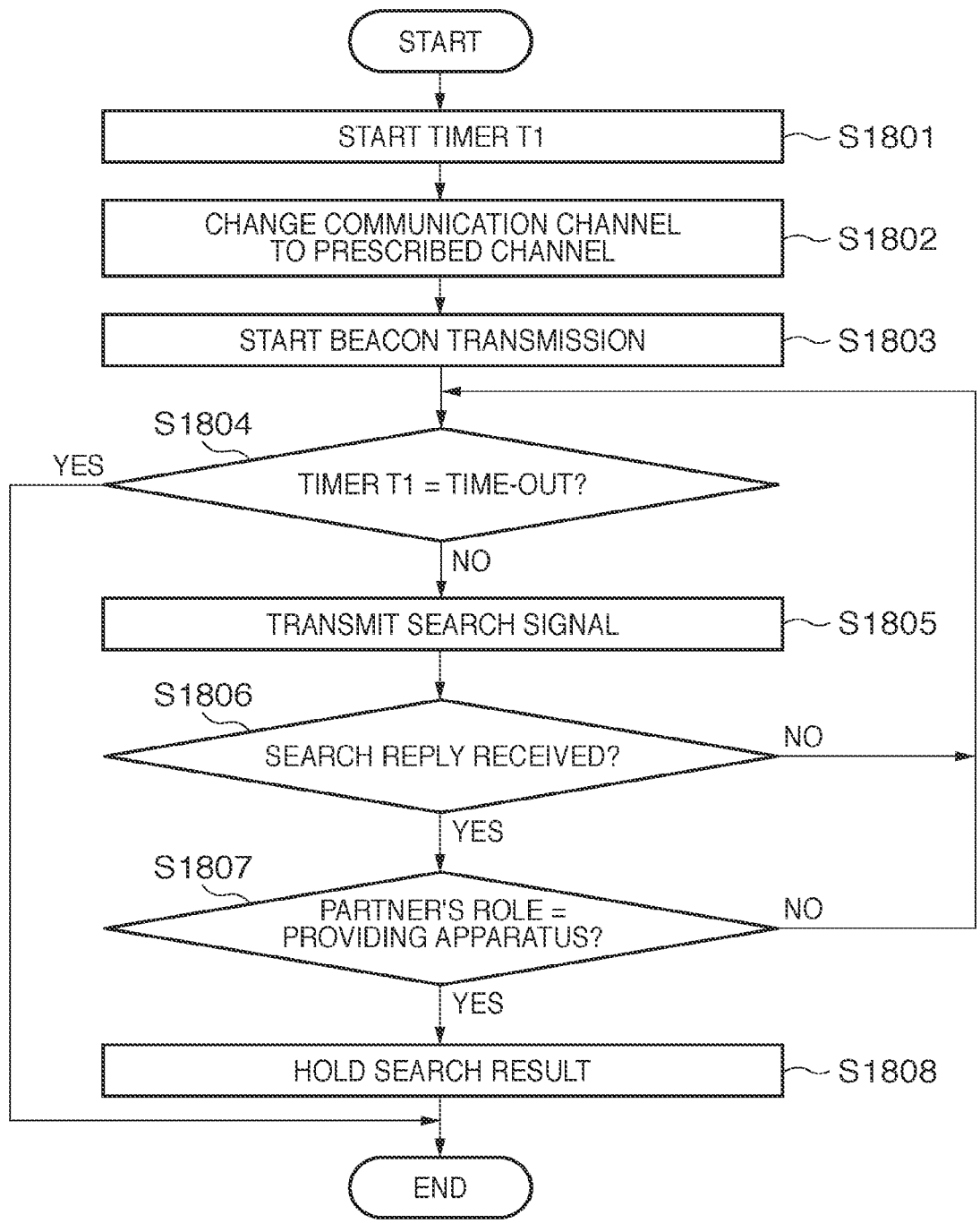
FIG. 18 is a flowchart showing a providing apparatus discovery processing operation according to the second embodiment of the present invention.

FIG. 18 is a flowchart showing an example of the operation sequence of providing apparatus discovery processing to be executed in the second embodiment.

Control of the providing apparatus discovery processing will be described below with reference to this flowchart.

An apparatus starts the processing described using FIG. 8 in response to a start instruction of automatic communication parameter setting processing (pressing of the setting button 106), and starts the providing apparatus discovery processing in step S805. After the providing apparatus discovery processing is started, the apparatus starts the timer T1 (S1801).

The apparatus changes a wireless LAN channel from the current wireless LAN channel to a predetermined wireless LAN channel (S1802). Note that as the predetermined wireless LAN channel, a predetermined one of communication channels available in a communication network can be used. As the predetermined wireless LAN channel, a communication channel which is not used in a normal communication of those available in a communication network may be used. Using different communication channels as a communication channel used in a normal communication and that used in the providing apparatus discovery processing, the providing apparatus discovery processing can be executed without influencing a communication between other apparatuses.

After the wireless LAN channel is changed, the apparatus starts beacon (notification signal) transmitting processing (S1803). After the beacon transmitting processing is started, assume that the apparatus executes beacon transmission control using a beacon interval based on the IEEE802.11 standard, and keeps transmitting beacon signals periodically.

The apparatus determines if the timer T1 has reached a time-out (S1804). If the timer T1 has not reached a time-out yet, the apparatus transmits a search signal (probe request) (S1805). After the search signal is transmitted, the apparatus determines if a search reply is received (S1806). If no search reply is received, the process returns to step S1804 to determine the remaining time period of the timer T1. If the timer has not reached a time-out yet, the apparatus repeats processing from transmission of a search signal again.

If a search reply is received in step S1806, the apparatus confirms the contents of the received search reply signal to determine if the role of a partner apparatus is "communication parameter providing apparatus" (S1807). If the role of the partner apparatus is "communication parameter providing apparatus", the apparatus holds the search result (S1808), thus ending the providing apparatus discovery processing.

As a result of the determination processing in step S1807, if the role of the partner apparatus is not "communication parameter providing apparatus", the process returns to step S1804 to determine the remaining time period of the timer T1. If the timer has not reached a time-out yet, the apparatus repeats processing from transmission of a search signal again. Note that if the timer T1 has reached a time-out in step S1804, the apparatus determines that no providing apparatus is detected, thus ending the providing apparatus discovery processing.

Note that the automatic communication parameter setting processing executed by the communication parameter receiving processing in step S810 and the communication parameter providing processing in step S817 is executed using the predetermined communication channel. Hence, when the process advances from step S802 to step S815, the predetermined communication channel is set as a communication channel in step S815. After the communication parameter providing processing has succeeded or it is terminated as an error, the communication channel is restored to that before the beginning of the automatic communication parameter setting processing. In this embodiment, for example, the communication channel is restored in steps S820 and S821. Also, when the communication parameter receiving processing is terminated as an error, the communication channel may be restored to that before the beginning of the automatic communication parameter setting processing. In this embodiment, for example, the communication channel may be restored in step S813.

As described above, according to this embodiment, since the providing apparatus discovery processing is executed on the predetermined wireless LAN channel, a providing apparatus can be detected very quickly. Communication connection processing may be interrupted during the automatic communication parameter setting processing. However, since the providing apparatus discovery processing ends quickly, an interrupted time period of the communication connection processing can be shortened.

The preferred embodiments of the present invention have been described, but they are examples for the purpose of the description of the present invention, and the scope of the present invention is not limited to only these embodiments. Various modifications of the embodiments can be made without departing from the scope of the present invention.

In the examples described in the above embodiments, the CW value is changed to increase the number of times beacons are transmitted per unit time by the providing apparatus to be larger than other apparatuses. However, other parameters may be used as long as the providing apparatus can increase the number of times beacons are transmitted to be larger than other apparatuses. For example, if the beacon transmission interval (beacon cycle) can be changed, the providing apparatus decreases the beacon transmission interval, thus increasing the number of times beacons are transmitted per unit time.

In the above description, the CW is changed to be larger or smaller than the initial value. Since respective apparatuses do not always have the same CW initial value, if the CW is changed to a minimum value (CWmin) or maximum value (CWmax) within a changeable range, the beacon transmission frequency (the number of times) can be changed more reliably. The start notification message is described as a message that notifies that the automatic communication parameter setting processing is started.

However, the start notification message can also be expressed as a message which notifies the operation of the setting button 106 or a message that allows the providing apparatus to provide communication parameters to another receiving apparatus.

The above description has been given taking the wireless LAN compliant with the IEEE802.11 as an example. However, the present invention may be carried out for other wireless media such as wireless USB, MBOA, Bluetooth®, UWB, and ZigBee. Also, the present invention may be carried out for wired communication media such as a wired LAN.

Note that "MBOA" is an abbreviation for "Multi Band OFDM Alliance". Also, the UWB includes wireless USB, wireless 1394, WINET, and the like.

The network identifier, encryption method, encryption key, authentication method, and authentication key have been exemplified as the communication parameters. However, other kinds of information may be used, or other kinds of information may be included in the above communication parameters.

As described above, according to the present invention, even when the roles are not determined in advance in automatic communication parameter setting processing, communication parameter setting processing and network participating processing can be appropriately executed without any user's selections of the roles.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   one or more computers that causes the communication apparatus to:
   execute share processing for sharing a communication parameter by providing the communication parameter from a providing apparatus to a receiving apparatus;
   execute a wait processing, by waiting for a probe request from a communication partner apparatus, wherein, in a case where the communication apparatus receives a probe request during execution of the wait processing, the communication apparatus responds by sending a probe response, and wherein the communication partner apparatus executes a search processing, by sending a probe request and receiving a probe response in a plurality of channels including a first channel and a second channel, wherein the second channel is not adjacent to the first channel;
   determine a role of the communication apparatus to be one of a first role of operating as the providing apparatus in the share processing and a second role of operating as the receiving apparatus in the share processing based on a comparison of information about the communication apparatus and information received from the communication partner apparatus; and
   provide predetermined information to a user after the share processing is successful.

2. The communication apparatus according to claim 1, wherein the search processing in the first channel is finished, the communication partner apparatus executes the search processing in the second channel without the search processing in a third channel which is adjacent to the first channel.

3. The communication apparatus according to claim 1, wherein the one or more computers further causes the communication apparatus to:
   execute the search processing, by sending a probe request and receiving a probe response in a plurality of channels including a first channel and a second channel, wherein the second channel is not adjacent to the first channel, wherein when the search processing in the first channel is finished, the communication apparatus executes the search processing in the second channel without the search processing in a third channel which is adjacent to the first channel.

4. The communication apparatus according to claim 3, wherein the one or more computers further causes the communication apparatus to:
   start processing including the search processing, the wait processing and the share processing in accordance with an instruction from a user.

5. The communication apparatus according to claim 1, wherein the one or more computers further causes the communication apparatus to:
   notify that processing including the wait processing and the share processing has started.

6. The communication apparatus according to claim 1, wherein the one or more computers further causes the communication apparatus to:
   notify that the communication apparatus is performing a connection processing.

7. The communication apparatus according to claim 1, wherein the one or more computers further causes the communication apparatus to:
   notifying an error in a case where an error occurs in the share processing.

8. The communication apparatus according to claim 1, wherein, in the share processing, the communication apparatus provides the communication partner apparatus with the communication parameter in accordance with the role determined by the communication apparatus.

9. The communication apparatus according to claim 1, wherein information transmitted by the communication apparatus includes information indicating a role determined by the communication apparatus.

10. The communication apparatus according to claim 1, wherein the communication apparatus does not transmit a probe request during a period that the communication apparatus is executing the wait processing.

11. The communication apparatus according to claim 1, wherein information transmitted by the communication apparatus includes information indicating that the communication apparatus has a function to execute the share processing or information indicating that the share processing is being executed.

12. The communication apparatus according to claim 1, wherein the communication apparatus transmits a notification signal indicating existence of the communication apparatus using a channel from one of the plurality of channels during a period in which the communication apparatus is executing the wait processing.

13. The communication apparatus according to claim 11, wherein the one or more computers further cause the communication apparatus to:
allow another communication apparatus to join a network established between the communication apparatus and the communication partner apparatus.

14. The communication apparatus according to claim 3, wherein the one or more computers further cause the communication apparatus to:
determine, based on the received probe response, whether or not the communication partner apparatus which transmitted the probe response is a providing apparatus which provides communication parameters.

15. The communication apparatus according to claim 1, wherein the communication apparatus executes the share processing based on a Registration protocol regulated in Wi-Fi Protected Setup (WPS).

16. The communication apparatus according to claim 1, wherein the communication apparatus executes a 4-way handshake regulated in IEEE802.11i and Wi-Fi Protected Access (WPA) in a case where the communication apparatus connects to the communication partner apparatus based on the communication parameter.

17. The communication apparatus according to claim 1, wherein the communication parameter includes at least one of SSID (Service Set Identifier), an encryption method, an encryption key, an authentication method, and an authentication key.

18. The communication apparatus according to claim 1, wherein the communication parameter is a parameter for performing a wireless communication compliant with the IEEE802.11 standard.

19. The communication apparatus according to claim 1, wherein the one or more computers further cause the communication apparatus to:
end the share processing in a case where the share processing performed by the communication apparatus is failed.

20. The communication apparatus according to claim 1, wherein length of period for the wait processing is randomly determined.

21. A method of controlling a communication apparatus, comprising:
executing share processing for sharing a communication parameter by providing the communication parameter from a providing apparatus to a receiving apparatus;
executing a wait processing, by waiting for a probe request from a communication partner apparatus, wherein, in a case where the communication apparatus receives a probe request during execution of the wait processing, the communication apparatus responds by sending a probe response, and wherein the communication partner apparatus executes a search processing, by sending a probe request and receiving a probe response in a plurality of channels including a first channel and a second channel, wherein the second channel is not adjacent to the first channel;
determining a role of the communication apparatus to be one of a first role of operating as the providing apparatus in the share processing and a second role of operating as the receiving apparatus in the share processing based on a comparison of information about the communication apparatus and information received from the communication partner apparatus; and
providing predetermined information to a user after the share processing is successful.

22. A non-transitory computer-readable storage medium storing a program for causing a computer to execute a method of controlling a communication apparatus, the method comprising:
executing share processing for sharing a communication parameter by providing the communication parameter from a providing apparatus to a receiving apparatus;
executing a wait processing, by waiting for a probe request from a communication partner apparatus, wherein, in a case where the communication apparatus receives a probe request during execution of the wait processing, the communication apparatus responds by sending a probe response, and wherein the communication partner apparatus executes a search processing, by sending a probe request and receiving a probe response in a plurality of channels including a first channel and a second channel, wherein the second channel is not adjacent to the first channel;
determining a role of the communication apparatus to be one of a first role of operating as the providing apparatus in the share processing and a second role of operating as the receiving apparatus in the share processing based on a comparison of information about the communication apparatus and information received from the communication partner apparatus; and
providing predetermined information to a user after the share processing is successful.

* * * * *